(12) United States Patent
Bode et al.

(10) Patent No.: US 7,206,778 B2
(45) Date of Patent: Apr. 17, 2007

(54) TEXT SEARCH ORDERED ALONG ONE OR MORE DIMENSIONS

(75) Inventors: Andreas Bode, Palo Alto, CA (US); Max Copperman, Santa Cruz, CA (US)

(73) Assignee: Knova Software Inc., Cupertino, CA (US)

(*) Notice: Subject to any disclaimer, the term of this patent is extended or adjusted under 35 U.S.C. 154(b) by 516 days.

(21) Appl. No.: 10/023,433

(22) Filed: Dec. 17, 2001

(65) Prior Publication Data

US 2003/0115187 A1 Jun. 19, 2003

(51) Int. Cl.
*G06F 17/30* (2006.01)
(52) U.S. Cl. ............................................. 707/5; 707/4
(58) Field of Classification Search ............. 707/3, 707/4, 5, 10
See application file for complete search history.

(56) References Cited

U.S. PATENT DOCUMENTS

| | | | |
|---|---|---|---|
| 4,918,621 A | 4/1990 | Nado et al. | 364/513 |
| 5,034,898 A | 7/1991 | Lu et al. | 364/513 |
| 5,309,359 A | 5/1994 | Katz et al. | 364/419.19 |
| 5,404,295 A | 4/1995 | Katz et al. | 364/419.19 |
| 5,553,226 A | 9/1996 | Kiuchi et al. | 395/161 |
| 5,555,408 A | 9/1996 | Fujisawa et al. | 395/600 |
| 5,568,640 A | 10/1996 | Nishiyama et al. | 395/600 |
| 5,594,837 A | 1/1997 | Noyes | 395/63 |
| 5,600,831 A | 2/1997 | Levy et al. | 395/602 |
| 5,625,748 A | 4/1997 | McDonough et al. | 395/2.6 |
| 5,625,767 A | 4/1997 | Bartell et al. | 395/140 |
| 5,628,009 A | 5/1997 | Kikuta et al. | 395/610 |
| 5,630,125 A | 5/1997 | Zellweger | 395/614 |
| 5,644,740 A | 7/1997 | Kiuchi | 395/357 |

(Continued)

FOREIGN PATENT DOCUMENTS

WO WO-97/38378 10/1997

(Continued)

OTHER PUBLICATIONS

Dogpile, web.archive.org/web/19961220043459/http://dogpile.com*

(Continued)

*Primary Examiner*—Greta Robinson
(74) *Attorney, Agent, or Firm*—Schwegman, Lundberg, Woessner & Kluth, P.A.

(57) ABSTRACT

This document discusses, among other things, systems and methods for searching for relevant documents in a document corpus. Using, among other things, text provided by a user's query, the system undertakes a dynamic search process that includes at least one ordered sequence of searches. The results of a first search are evaluated to determine how to formulate a second or subsequent search, whether to perform a second or subsequent search, or whether or how to present to the user results from the search or searches performed up to that point. In one example, the first search uses tight criteria in conjunction with the language of the user's query. If the number of documents in the search results do not meet or exceed a threshold value, the search criteria is progressively loosened over subsequent searches. The search list may depend on, among other things, a characteristic of the user query or upon a result returned by a previous search on the user query.

84 Claims, 9 Drawing Sheets

U.S. PATENT DOCUMENTS

| | | | |
|---|---|---|---|
| 5,655,116 A | 8/1997 | Kirk et al. | 395/601 |
| 5,659,725 A | 8/1997 | Levy et al. | 395/600 |
| 5,671,333 A | 9/1997 | Catlett et al. | 395/20 |
| 5,724,571 A | 3/1998 | Woods | 395/605 |
| 5,768,578 A | 6/1998 | Kirk et al. | 395/611 |
| 5,787,417 A | 7/1998 | Hargrove | 707/4 |
| 5,794,050 A | 8/1998 | Dahlgren et al. | 395/708 |
| 5,809,499 A | 9/1998 | Wong et al. | 707/6 |
| 5,819,258 A | 10/1998 | Vaithyanathan et al. | 707/2 |
| 5,845,270 A | 12/1998 | Schatz et al. | 706/11 |
| 5,878,423 A | 3/1999 | Anderson et al. | 707/100 |
| 5,933,822 A * | 8/1999 | Braden-Harder et al. | 707/5 |
| 5,963,940 A * | 10/1999 | Liddy et al. | 707/5 |
| 5,991,756 A | 11/1999 | Wu | 707/3 |
| 6,169,986 B1 | 1/2001 | Bowman et al. | 707/5 |
| 6,233,575 B1 | 5/2001 | Agrawal et al. | 707/6 |
| 6,256,627 B1 | 7/2001 | Beattie et al. | 707/6 |
| 6,282,538 B1 | 8/2001 | Woods | 707/5 |
| 6,297,824 B1 | 10/2001 | Hearst et al. | 345/357 |
| 6,301,579 B1 | 10/2001 | Becker | 707/102 |
| 6,314,420 B1 | 11/2001 | Lang et al. | 707/3 |
| 6,324,534 B1 * | 11/2001 | Neal et al. | 707/3 |
| 6,434,550 B1 | 8/2002 | Warner et al. | 707/3 |
| 6,493,711 B1 | 12/2002 | Jeffrey | |
| 6,553,372 B1 * | 4/2003 | Brassell et al. | 707/5 |
| 6,584,224 B2 | 6/2003 | Sun et al. | |
| 6,598,047 B1 * | 7/2003 | Russell et al. | 707/5 |
| 2002/0052894 A1 * | 5/2002 | Bourdoncle et al. | 707/513 |
| 2003/0014405 A1 * | 1/2003 | Shapiro et al. | |
| 2003/0055810 A1 * | 3/2003 | Cragun et al. | 707/1 |
| 2003/0217052 A1 * | 11/2003 | Rubenczyk et al. | 707/3 |
| 2003/0220917 A1 * | 11/2003 | Copperman et al. | 707/3 |
| 2004/0083211 A1 * | 4/2004 | Bradford | 707/3 |

FOREIGN PATENT DOCUMENTS

| | | |
|---|---|---|
| WO | WO-99/18526 | 4/1999 |

OTHER PUBLICATIONS

"(Kanisa) Intelligized Business Processes", (1998), 12 pgs.
"About the Information Manifold", *web page*, 1 pg.
"FAQ—Connect Care by ProAmerica", (1998),3 pgs.
"IBM Version 2—Intelligent Miner for Data", (1998),2 pgs.
"IBM Version 2.1—Intelligent Miner for Data", (1998),2 pgs.
"IBM's Data Mining Technology", (1996),25 pgs.
"Industry Solutions: Markets and Applications", (Nov. 19, 1998,3 pgs.
"Kana Communications—Success Story: eBay", (Nov. 1998),4 pgs.
"Kana Communications—Success Story: Netscape", 4 pgs.
"ProAmerica Connect Care—The First Customer Care Software", 12 pgs.
"ProAmerica Redefines Customer Care with Visual Warehouse", *IBM*, (Feb. 1998),2 pgs.
"Quality Connect", *Web Page*, (1998).
"Sales Connect", *Web Page*, (1998).
"SCM—Theory of Customer Care, ProAmerica", (1996),28 pgs.
"Support Connect", *Web Page*, (1998).
"Survey Connect", *Web Page*, (1998).
"Using the Intelligent Miner in a Simple Scenario", *Version 2.1.1, IBM*,(Apr. 1998),35 pgs.
"Web Connect", *webpage*, (Nov. 1998),2 pgs.
Buckley, James P., "A Hierarchical Clustering Strategy for Very Large Fuzzy Databases", *IEEE Int'l Conf. on Systems, Man and Cybernetics, 4*, (1995),3573-3578.
Chakrabarti, Soumen, et al., "Scalable Feature Selection, Classification and Signature Generation for Organizing Large Text Databases into Hierarchical Topic Taxonomies", *The VLDB Journal, 7*, (1998), 163-178.
Li, Wen-Syan, "PowerBookmarks: A System for Personalizable Web Information Organization, Sharing, and Management", *Proc. ACM SIGMOD Int'l. Conf. on Management of Data, 28*, (1999), 565-567.
Magennis, Mark, "The Potential and Actual Effectiveness of Interactive Query Expansion", *Annual Int'l. ACN-SIGIR Conf. On Research and Development in Information Retrieval*, (1997),324-332.
Stodder, David, "Toward Universal Business Intelligence: An Interview with Janet Perna", (1997),6 pgs.
Tkach, Daniel S., "Information Mining with the IBM Intelligent Miner Family", *An IBM Software Solutions White Paper*, (1998), 1-29.
Wong, Jacqueline W., "Action: Automatic Classification for Full-Text Documents", *Association of Computing Machinery SIGIR Forum, 30*, (1996),26-41.

\* cited by examiner

TEXT SEARCH ORDERED ALONG ONE OR MORE DIMENSIONS

FIELD OF THE INVENTION

This document relates generally to, among other things, computer-based content provider systems, devices, and methods and specifically, but not by way of limitation, to systems, devices, and methods for performing a text search ordered along one or more dimensions.

BACKGROUND

A computer network, such as the Internet or World Wide Web, typically serves to connect users to the information, content, or other resources that they seek. Web content, for example, varies widely both in type and subject matter. Examples of different content types include, without limitation: text documents; audio, visual, and/or multimedia data files. A particular content provider, which makes available a predetermined body of content to a plurality of users, must steer a member of its particular user population to relevant content within its body of content.

For example, in an automated customer relationship management (CRM) system, the user is typically a customer of a product or service who has a specific question about a problem or other aspect of that product or service. Based on a query or other request from the user, the CRM system must find the appropriate technical instructions or other documentation to solve the user's problem. Using an automated CRM system to help customers is typically less expensive to a business enterprise than training and providing human applications engineers and other customer service personnel. According to one estimate, human customer service interactions presently cost between $15 and $60 per customer telephone call or e-mail inquiry. Automated Web-based interactions typically cost less than one tenth as much, even when accounting for the required up-front technology investment.

One ubiquitous navigation technique used by content providers is the Web search engine. A Web search engine typically searches for user-specified text, either within a document, or within separate metadata associated with the content. Language, however, is ambiguous. The same word in a user query can take on very different meanings in different context. Moreover, different words can be used to describe the same concept. These ambiguities inherently limit the ability of a search engine to discriminate against unwanted content. This increases the time that the user must spend in reviewing and filtering through the unwanted content returned by the search engine to reach any relevant content. As anyone who has used a search engine can relate, such manual user intervention can be very frustrating. User frustration can render the body of returned content useless even when it includes the sought-after content. When the user's inquiry is abandoned because excess irrelevant information is returned, or because insufficient relevant information is available, the content provider has failed to meet the particular user's needs. As a result, the user must resort to other techniques to get the desired content. For example, in a CRM application, the user may be forced to place a telephone call to an applications engineer or other customer service personnel. As discussed above, however, this is a more costly way to meet customer needs. For these and other reasons, the present inventors have recognized the existence of an unmet need to provide improved tools and techniques for searching for text in content data or metadata using textual and/or other input(s) obtained from a user.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1:
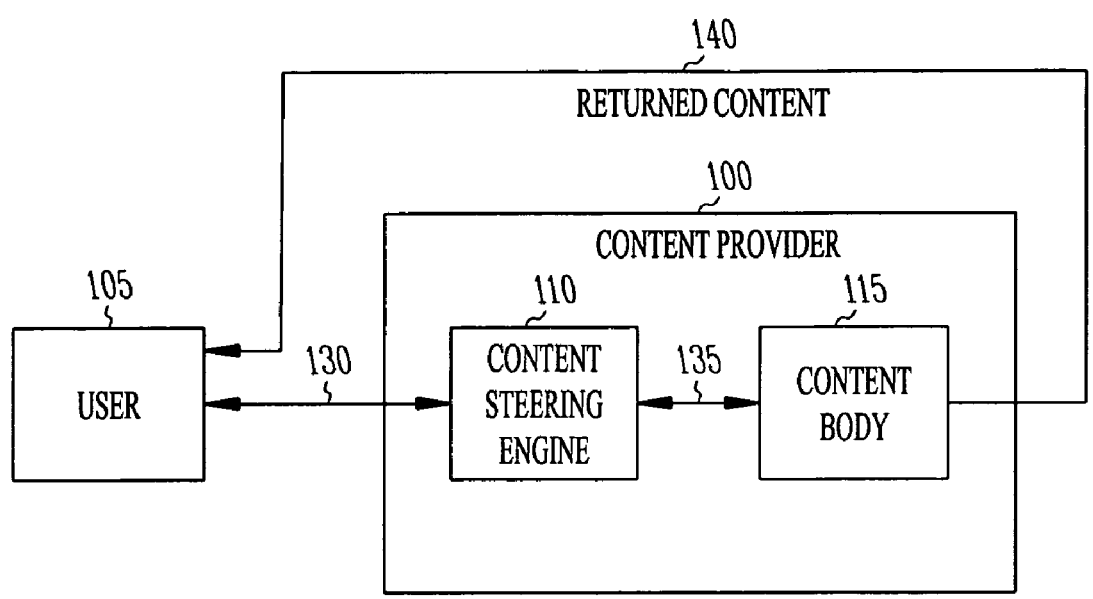
FIG. 1 is a block diagram illustrating generally one example of a content provider illustrating how a user is steered to content.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the spirit and scope of the present invention. The following detailed description is, therefore, not to be taken in a limiting sense, and the scope of the present invention is defined by the appended claims and their equivalents. In this document, the terms "a" or "an" are used, as is common in patent documents, to include one or more than one. Furthermore, all publications, patents, and patent documents referred to in this document are incorporated by reference herein in their entirety, as though individually incorporated by reference. In the event of inconsistent usages between this documents and those documents so incorporated by reference, the usage in the incorporated reference(s) should be considered supplementary to that of this document; for irreconciliable inconsistencies, the usage in this document controls.

Some portions of the following detailed description are presented in terms of algorithms and symbolic representations of operations on data bits within a computer memory. These algorithmic descriptions and representations are the ways used by those skilled in the data processing arts to most effectively convey the substance of their work to others skilled in the art. An algorithm includes a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Top-Level Example of Content Provider

FIG. 1 is a block diagram illustrating generally one example of a content provider 100 system illustrating generally how a user 105 is steered to content. In this example, user 105 is linked to content provider 100 by a communications network, such as the Internet, using a Web-browser or any other suitable access modality. Content provider 100 includes, among other things, a content steering engine 110 for steering user 105 to relevant content within a body of content 115. In FIG. 1, content steering engine 110 receives from user 105, at user interface 130, a request or query for content relating to a particular concept or group of concepts manifested by the query. In addition, content steering engine 110 may also receive other information obtained from the user 105 during the same or a previous encounter. Furthermore, content steering engine 110 may extract additional information by carrying on an intelligent dialog with user 105, such as described in commonly assigned Fratkina et al. U.S. patent Ser. No. 09/798,964 entitled "A SYSTEM AND METHOD FOR PROVIDING AN INTELLIGENT MULTI-STEP DIALOG WITH A USER," filed on Mar. 6, 2001, which is incorporated by reference herein in its entirety, including its description of obtaining additional information from a user by carrying on a dialog.

In response to any or all of this information extracted from the user, content steering engine 110 outputs at 135 indexing information relating to one or more relevant pieces of content, if any, within content body 115. In response, content body 115 outputs at user interface 140 the relevant content, or a descriptive indication thereof, to user 105. Multiple returned content "hits" may be unordered or may be ranked according to perceived relevance to the user's query. One embodiment of a retrieval system and method is described in commonly assigned Copperman et al. U.S. patent application Ser. No. 09/912,247, entitled SYSTEM AND METHOD FOR PROVIDING A LINK RESPONSE TO INQUIRY, filed Jul. 23, 2001, which is incorporated by reference herein in its entirety, including its description of a retrieval system and method. Content provider 100 may also adaptively modify content steering engine 110 and/or content body 115 in response to the perceived success or failure of a user's interaction session with content provider 100. One such example of a suitable adaptive content provider 100 system and method is described in commonly assigned Angel et al. U.S. patent application Ser. No. 09/911,841 entitled "ADAPTIVE INFORMATION RETRIEVAL SYSTEM AND METHOD," filed on Jul. 23, 2001, which is incorporated by reference in its entirety, including its description of adaptive response to successful and nonsuccessful user interactions. Content provider 100 may also provide reporting information that may be helpful for a human knowledge engineer {"KE") to modify the system and/or its content to enhance successful user interaction sessions and avoid nonsuccessful user interactions, such as described in commonly assigned Kay et al. U.S. patent application Ser. No. 09/911,839 entitled, "SYSTEM AND METHOD FOR MEASURING THE QUALITY OF INFORMATION RETRIEVAL," filed on Jul. 23, 2001, which is incorporated by reference herein in its entirety, including its description of providing reporting information about user interactions.

Overview of Example CRM Using
Taxonomy-Based Knowledge Map

The system discussed in this document can be applied to any system that assists a user in navigating through a content base to desired content. A content base can be organized in any suitable fashion. In one example, a hyperlink tree structure or other technique is used to provide case-based reasoning for guiding a user to content. Another implementation uses a content base organized by a knowledge map made up of multiple taxonomies to map a user query to desired content, such as described in commonly assigned Copperman et al. U.S. patent application Ser. No. 09/594,083, entitled SYSTEM AND METHOD FOR IIMPLE-MENTiNG A KNOWLEDGE MANAGEMENT SYSTEM, filed on Jun. 15, 2000, now issued as U.S. Pat. No. 6,711,585, which is incorporated herein by reference in its entirety, including its description of a multiple taxonomy knowledge map and techniques for using the same.

Figure 2:
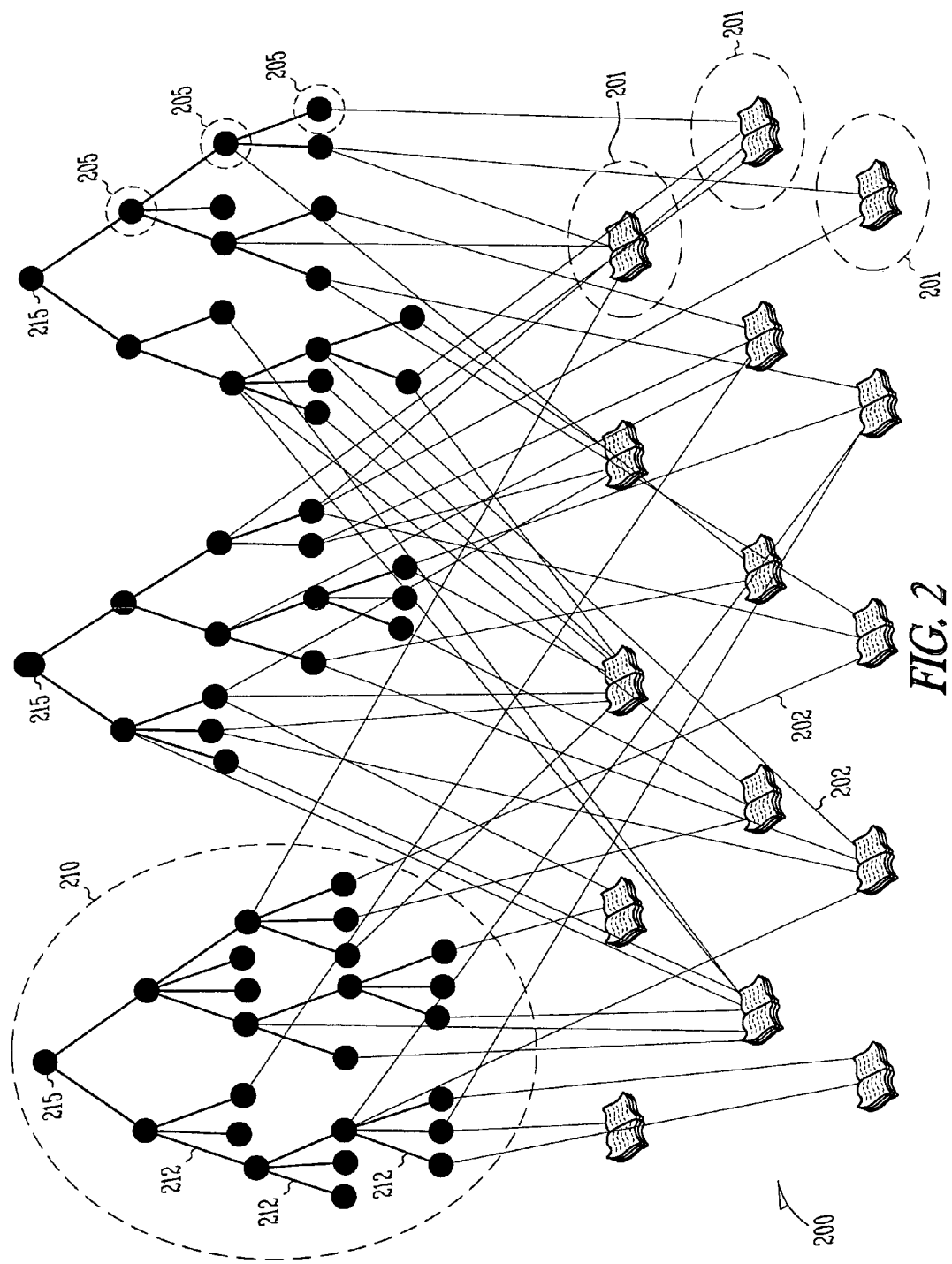
FIG. 2 is an example of a knowledge map.

As discussed in detail in that document (with respect to a CRM system) and incorporated herein by reference, and as illustrated here in the example knowledge map 200 in FIG. 2, documents or other pieces of content (referred to as knowledge containers 201) are mapped by appropriately-weighted tags 202 to concept nodes 205 in multiple taxonomies 210 (i.e., classification systems). Each taxonomy 210 is a directed acyclical graph (DAG) or tree (i.e., a hierarchical DAG) with appropriately-weighted edges 212 connecting concept nodes to other concept nodes within the taxonomy 210 and to a single root concept node 215 in each taxonomy 210. Thus, each root concept node 215 effectively defines its taxonomy 210 at the most generic level. Concept nodes 205 that are further away from the corresponding root concept node 215 in the taxonomy 210 are more specific than those that are closer to the root concept node 215. Multiple taxonomies 210 are used to span the body of content (knowledge corpus) in multiple different (typically orthogonal) ways.

As discussed in U.S. Pat. No. 6,711,585 and incorporated herein by reference, taxonomy types include, among other things, topic taxonomies (in which concept nodes 205 represent topics of the content), filter taxonomies (in which concept nodes 205 classify metadata about content that is not derivable solely from the content itself), and lexical taxonomies (in which concept nodes 205 represent language in the content). Knowledge container 201 types include, among other things: document (e.g., text); multimedia (e.g., sound and/or visual content); e-resource (e.g., description and link to online information or services); question (e.g., a user query); answer (e.g., a CRM answer to a user question); previously-asked question (PQ; e.g., a user query and corresponding CRM answer); knowledge consumer (e.g., user information); knowledge provider (e.g., customer support staff information); product (e.g., product or product family information). It is important to note that, in this document, content is not limited to electronically stored content, but also allows for the possibility of a human expert providing needed information to the user. For example, the returned content list at 140 of FIG. 1 herein could include information about particular customer service personnel within content body 115 and their corresponding areas of expertise. Based on this descriptive information, user 105 could select one or more such human information providers, and be linked to that provider (e.g., by e-mail, Internet-based telephone or videoconferencing, by providing a direct-dial telephone number to the most appropriate expert, or by any other suitable communication modality).

Figure 3:
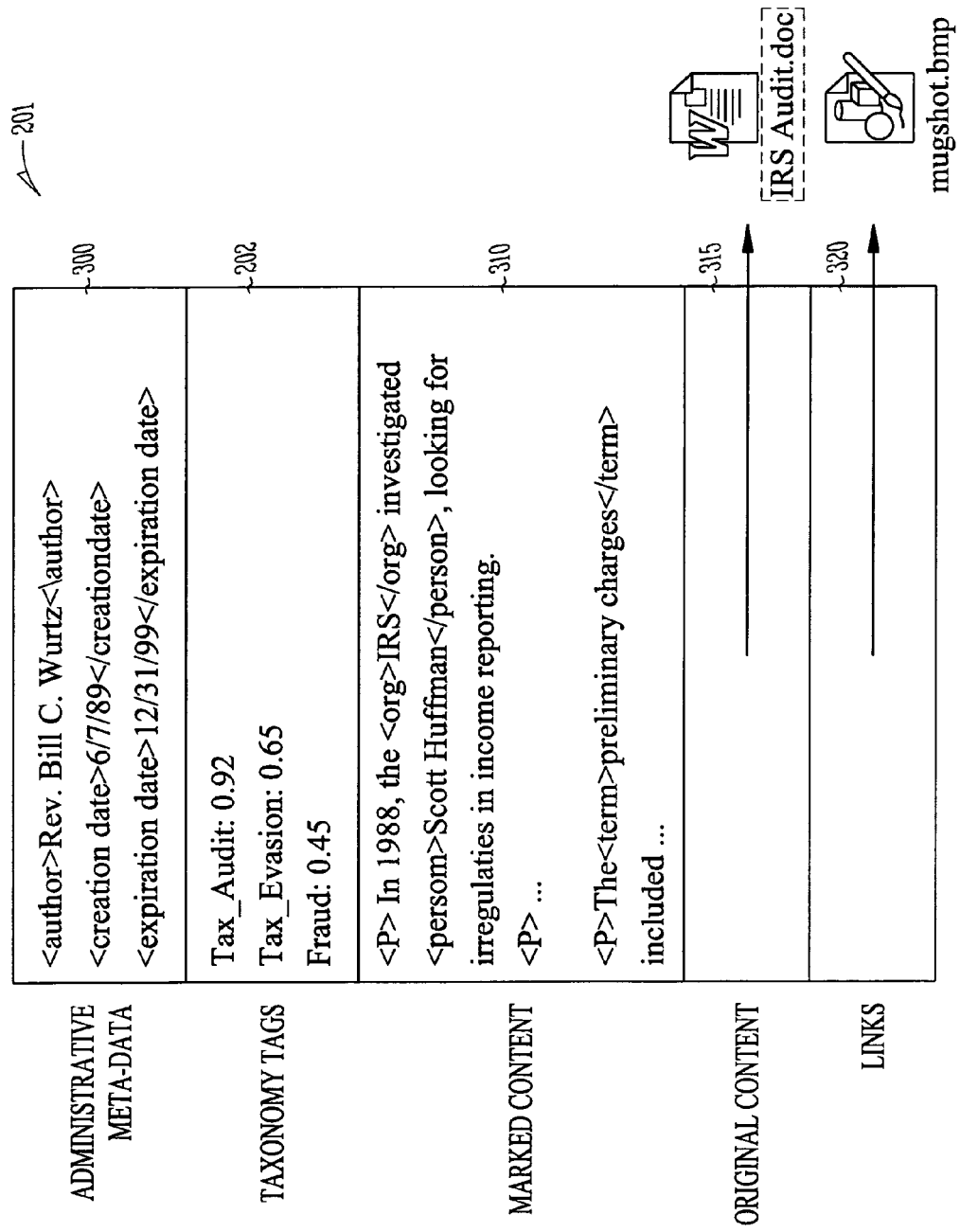
FIG. 3 is a schematic diagram illustrating generally one example of portions of a document-type knowledge container.

FIG. 3 is a schematic diagram illustrating generally one example of portions of a document-type knowledge container 201. In this example, knowledge container 201 includes, among other things, administrative metadata 300, contextual taxonomy tags 202, marked content 310, original content 315, and links 320. Administrative metadata 300 may include, for example, structured fields carrying information about the knowledge container 201 (e.g., who created it, who last modified it, a title, a synopsis, a uniform resource locator (URL), etc. Such metadata need not be present in the content carried by the knowledge container 201. Taxonomy tags 202 provide context for the knowledge container 201, i.e., they map the knowledge container 201, with appropriate weighting, to one or more concept nodes 205 in one or more taxonomies 210. Marked content 310 flags and/or interprets important, or at least identifiable, components of the content using a markup language (e.g., hypertext markup language (HTML), extensible markup language (XML), etc.). Original content 315 is a portion of an original document or a pointer or link thereto. Links 320 may point to other knowledge containers 201 or locations of other available resources.

U.S. Pat. No. 6,711,585 also discusses in detail techniques incorporated herein by reference for, among other things: (a) creating appropriate taxonomies 210 to span a content body and appropriately weighting edges in the taxonomies 210; (b) slicing pieces of content within a content body into manageable portions, if needed, so that such portions may be represented in knowledge containers 201; (c) autocontextualizing the knowledge containers 201 to appropriate concept node(s) 205 in one or more taxonomies, and appropriately weighting taxonomy tags 202 linking the knowledge containers 201 to the concept nodes 205; (d) indexing knowledge containers 201 tagged to concept nodes 205; (e) regionalizing portions of the knowledge map based on taxonomy distance function(s) and/or edge and/or tag weightings; and (f) searching the knowledge map 200 for content based on a user query and returning relevant content. Other techniques for associating documents or other knowledge containers 201 with concept nodes 205 are described in commonly assigned Ukrainczyk et al. U.S. patent application Ser. No. 09/864,156, entitled A SYSTEM AND METHOD FOR AUTOMATICALLY CLASSIFYiNG TEXT, filed on May 25, 2001, now issued as U.S. Pat. No. 7,028,250, which is incorporated herein by reference in its entirety, including its disclosure of a suitable example of a document classifier. Still other techniques for associating documents or other knowledge containers 201 with concept nodes 205 are described in commonly assigned Waterman et al. U.S. patent application Ser. No. 10/004,264, entitled DEVICE AND METHOD FOR ASSISTING KNOWL-EDGE ENGINEER IN ASSOCIATING INTELLIGENCE WITH CONTENT, filed on Oct. 31, 2001, which is incorporated herein by reference in its entirety, including its disclosure of a knowledge engineer user interface for tagging documents to concept nodes.

It is important to note that the user's request for content need not be limited to a single query. Instead, interaction between user 105 and content provider 100 may take the form of a multi-step dialog. One example of such a multi-step personalized dialog is discussed in commonly assigned Fratkina et al. U.S. patent application Ser. No. 09/798,964 entitled, A SYSTEM AND METHOD FOR PROVIDING AN INTELLIGENT MULTI-STEP DIALOG WITH A USER, filed on Mar. 6, 2001, which is incorporated by reference herein in its entirety, including its dialog description. That patent document discusses a dialog model between a user 105 and a content provider 100. It allows user 105 to begin with an incomplete or ambiguous problem description. Based on the initial problem description, a "topic spotter" directs user 105 to the most appropriate one of many possible dialogs. By engaging user 105 in the appropriately-selected dialog, content provider 100 elicits unstated elements of the problem description, which user 105 may not know at the beginning of the interaction, or may not know are important. It may also confirm uncertain or possibly ambiguous assignment, by the topic spotter, of concept nodes to the user's query by asking the user explicitly for clarification. In general, content provider 100 asks only those questions that are relevant to the problem description stated so far. Based on the particular path that the dialog follows, content provider 100 discriminates against content it deems irrelevant to the user's needs, thereby efficiently guiding user 105 to relevant content. In one example, the dialog is initiated by an e-mail inquiry from user 105. That is, user 105 sends an e-mail question or request to CRM content provider 100 seeking certain needed information. The topic spotter parses the text of the user's e-mail and selects a particular entry-point into a user-provider dialog from among several possible dialog entry points. The CRM content provider 100 then sends a reply e-mail to user 105, and the reply e-mail includes a hyperlink to a web-browser page representing the particularly selected entry-point into the dialog. The subsequent path taken by user 105 through the user-provider dialog is based on the user's response to questions or other information prompts provided by CRM content provider 100. The user's particular response selects among several possible dialog paths for guiding user 105 to further provider prompts and user responses until, eventually, CRM system 100 steers user 105 to what the CRM system 100 determines is most likely to be the particular content needed by the user 105.

For the purposes of the present document, it is important to note that the dialog interaction between user 105 and content provider 100 yields information about the user 105 (e.g., skill level, interests, products owned, services used, etc.). The particular dialog path taken (e.g., clickstream and/or language communicated between user 105 and content provider 100) yields information about the relevance of particular content to the user's needs as manifested in the original and subsequent user requests/responses. Moreover, interactions of user 105 not specifically associated with the dialog itself may also provide information about the relevance of particular content to the user's needs. For example, if user 105 leaves the dialog (e.g., using a "Back" button on a Web-browser) without reviewing content returned by content provider 100, an nonsuccessful user interaction (NSI) may be inferred. In another example, if user 105 chooses to "escalate" from the dialog with automated content provider 100 to a dialog with a human expert, this may, in one embodiment, be interpreted as an NSI. Moreover, the dialog may provide user 105 an opportunity to rate the relevance of returned content, or of communications received from content provider 100 during the dialog. As discussed above, one or more aspects of the interaction between user 105 and content provider 100 may be used as a feedback input for adapting content within content body 115, or adapting the way in which content steering engine 110 guides user 105 to needed content.

Examples of Devices and Methods for Performing Retrieval

Figure 4:
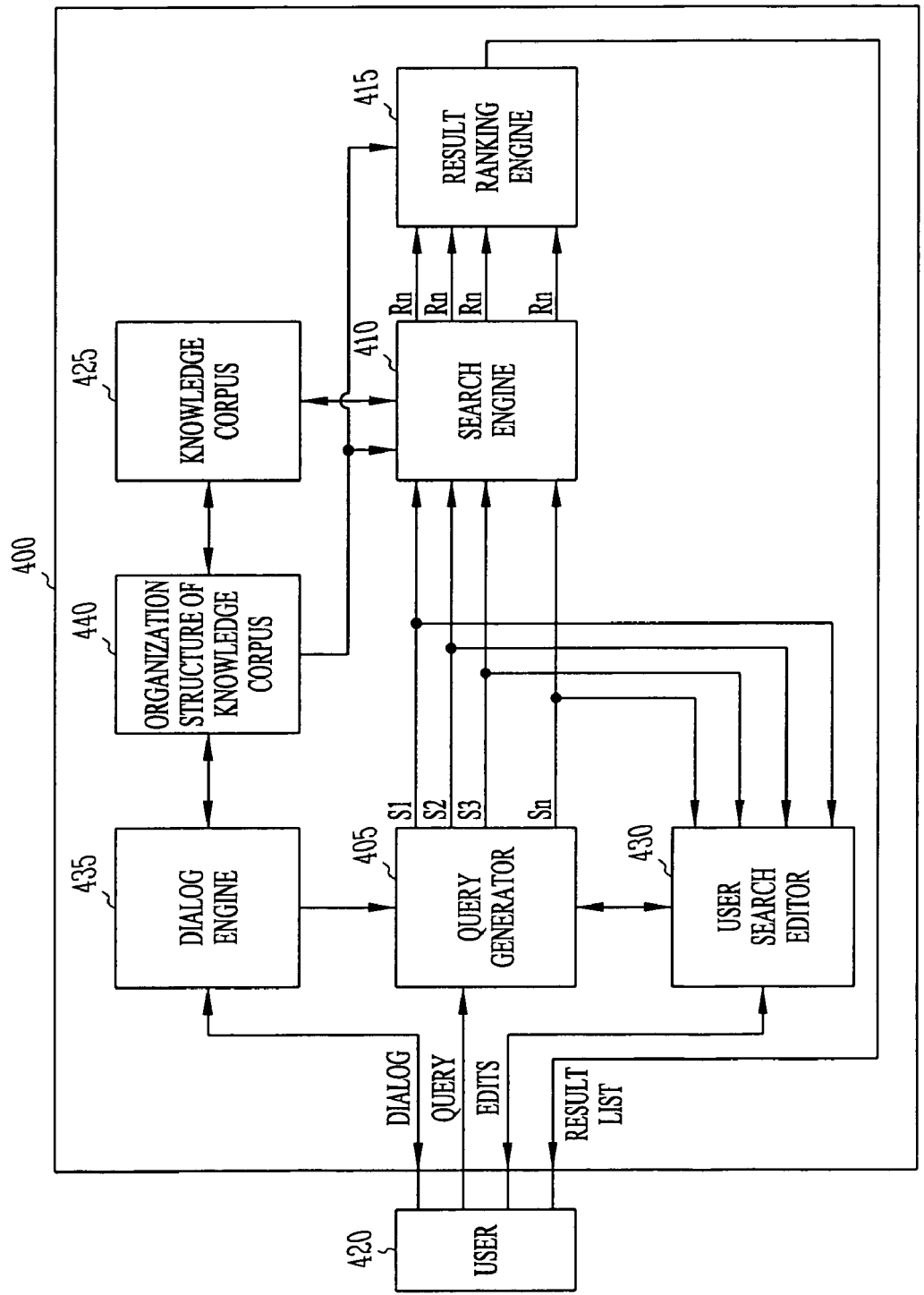
FIG. 4 is a block diagram illustrating generally portions of a system for searching for and retrieving stored documents or other knowledge containers using, among other things, a text query and/or other information obtained during a user's session and, optionally using other search and/or retrieval constraint(s).

FIG. 4 is a block diagram illustrating generally portions of a system 400 for searching for and retrieving stored documents or other knowledge containers 201 using, among other things, a text query and/or other information obtained during a user's session and, optionally using other search and/or retrieval constraint(s). Other suitable examples of a search and retrieval systems and methods are discussed in commonly assigned Copperman et al. U.S. patent application Ser. No. 09/912,247, entitled SYSTEM AND METHOD FOR PROVIDING A LINK RESPONSE TO INQUIRY, filed Jul. 23, 2001, which is incorporated by reference herein in its entirety, including its description of retrieval systems and methods.

In FIG. 4, system 400 includes a query generator 405, a search engine 410 and a result ranking engine 415. Query generator receives a text, language-based, or other query from a human user 420. Based at least on the user-query, query generator 405 generates different searches S1, S2, S3, . . . , SN provided to search engine 410 for execution. Search engine 410 performs these searches on document and/or metadata text in knowledge corpus 425, returning corresponding search results R1, R2, R3, . . . , RN. These searches may also be performed on selected portions (e.g., title, abstract, symptoms, etc.) of the documents. Moreover, these searches may be performed on one or more text portions of taxonomies or other organizational structure 440 of knowledge corpus 425.

The search results R1, R2, R3, . . . , RN include lists of documents (if any) matching the search criteria. The search results may also include information about the search criteria that were used to generate the search results and/or corresponding statistical information (e.g., how many matching documents ("hits") were returned). The search results may additionally include information corresponding to each document indicating the degree to which that document satisfied the search criteria.

If needed, result ranking engine 415 reorders documents returned in the various search results, such as by differently weighting the result of different searches and/or by using any information regarding the degree to which a particular document satisfied the search criteria. Result ranking engine 415 provides a ranked or otherwise ordered list of documents (i.e., a result list) to the user 420.

In FIG. 4, system 400 may additionally include a user search editor 430, which allows the user 420 to select/deselect particular searches S1, S2, S3, . . . , SN and/or to edit the criteria used for particular searches. System 400 may also additionally include a dialog engine 435 for carrying on a dialog with the user 420, as discussed above. Using taxonomies or any other organizational structure 440 of knowledge corpus 425, or using contextual or other information otherwise obtained (e.g., from the user 420) during the dialog session, dialog engine 435 imposes one or more additional constraints on one or more of the searches S1, S2, S3, . . . , SN. For example, a particular user's access privileges may limit one or more of the searches to particular portion(s) of the knowledge corpus 425. In another example, a user's response to a user interface prompt may limit one or more of the searches to particular portion(s) of the documents (e.g., "Activities," "Objects," "Products," and/or "Symptoms" portions of the documents).

In one example, system 400 performs up to three searches, S1, S2, and S3. In this example, first search S1 performs a free text search on all or selected portions of documents and/or metadata text using a Boolean "OR" of all information-bearing words in the user's text or language query. However, some prefiltering, stemming, or other text processing may be first performed on the user's query. Second search S2 performs a free text search on all or selected portions of documents and/or metadata text using a boolean "AND" of all information-bearing words in the user's text or language query (after any prefiltering, stemming, or other text processing). The selected portions of the documents in S2 may be the same selected portions as in S1, or may be different portions from those selected in S1. Third search S3 is performed, in this example, only if there are at least three information-bearing words in the user's query. In that case, third search S3 performs a free text search on a title portion of the documents using a boolean "AND" of all information-bearing words in the user's text or language query (after any prefiltering, stemming, or other text processing).

In another example, system 400 performs up to four searches, S1, S2, S3, and S4. In this example, first search S1 performs a free text search on all or selected portions of documents and/or metadata text using a boolean "OR" of all information-bearing words in the user's text or language query (after any prefiltering, stemming, or other text processing). First search S1 also uses the constraints provided by dialog engine 435, such as to restrict the search to particular subset(s) of documents of the knowledge corpus 425, or to particular portion(s) of the taxonomies or other structure by which knowledge corpus 425 is organized. Second search S2 performs a free text search on all or selected portions of documents and/or metadata text using a boolean "AND" of all information-bearing words in the user's text or language query (after any prefiltering, stemming, or other text processing). The selected portions of the documents in S2 may be the same selected portions as in S1, or may be different portions from those selected in S1.

Second search S2 may use a subset of the constraints provided by dialog engine 435, such as to restrict the search to broader portion(s) of the taxonomies or other structure by which knowledge corpus 425 is organized than searched by first search S1. Third search S3 is performed, in this example, only if there are at least three information-bearing words in the user's query. In that case, third search S3 performs a free text search on a title portion of the documents using a boolean "AND" of all information-bearing words in the user's text or language query (after any prefiltering, stemming, or other text processing). Third search S3 may use a different subset of the constraints provided by dialog engine 435 than used in second search S2. Thus, third search S3 may also restrict the search to broader portion(s) of the taxonomies or other structure by which knowledge corpus 425 is organized than searched by first search S1. Fourth search S4 performs a free text search on all or (same or differently) selected portions of documents and/or metadata text using a boolean "AND" of all information-bearing words in the user's text or language query (after any prefiltering, stemming, or other text processing). Fourth search S4 uses a set of derived constraints. The derived constraints are obtained using the full set of constraints provided by dialog engine 435 (i.e., same constraints as first search S1) This full set of constraints restricts the search to subset(s) of the documents associated with particular concept nodes in taxonomies, including documents associated with more specific concept nodes that underlie the broader concept nodes in its particular taxonomy tree structure. In search S4, the derived constraints remove from the fourth search S4 those documents associated with these underlying concept nodes, so that only those documents associated with the overlying relative root node are included in the fourth search S4.

In the above examples, result ranking engine 415 combines the search results R1, R2, R3, ..., RN into a combined result list returned to the user 420. The results may be weighted and/or reranked according to, among other things, which search(es) returned the resulting document(s), the degree to which a particular document satisfied the search criteria, and/or the degree or weight with which a particular document is associated with a particular concept node.

Examples of Devices and Methods for Performing Ordered Searches

Figure 5:
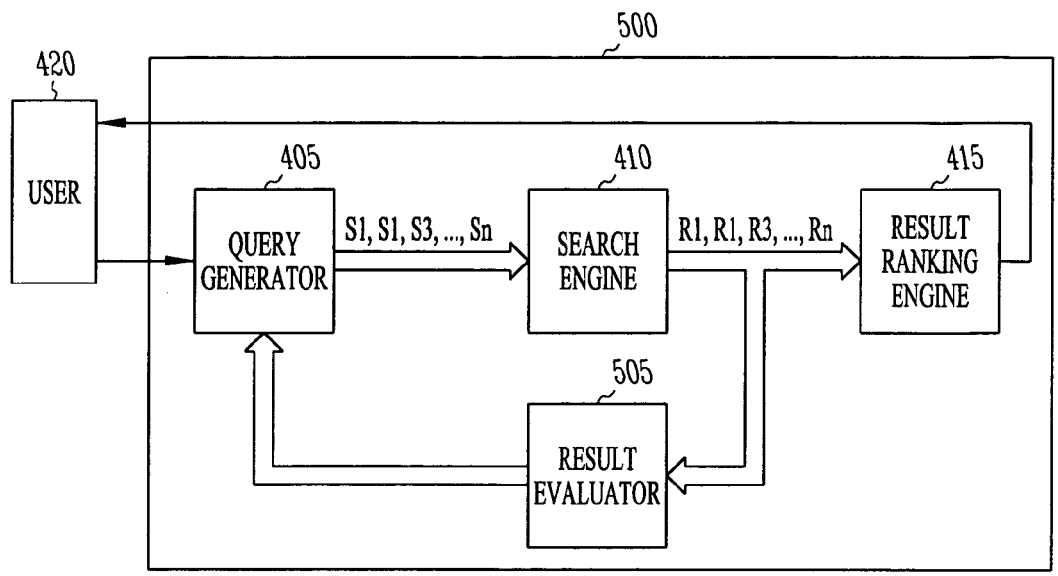
FIG. 5 is a block diagram illustrating generally portions of another system for searching for and retrieving stored documents or other knowledge containers using, among other things, a text query and/or other information obtained during a user's session and optionally using other search and/or retrieval constraint(s).

FIG. 5 is a block diagram illustrating generally portions of another system 500 for searching for and retrieving stored documents or other knowledge containers 201 using, among other things, a text query and/or other information obtained during a user's session, and optionally using other search and/or retrieval constraint(s). In this example, system 500 includes a result evaluator 505 module for evaluating at least one of search results R1, R2, R3, ..., RN. Based on the evaluation, at least one of searches S1, S2, S3, ..., SN is formulated by query generator 405 and/or executed, if needed, by search engine 410.

Figure 6:
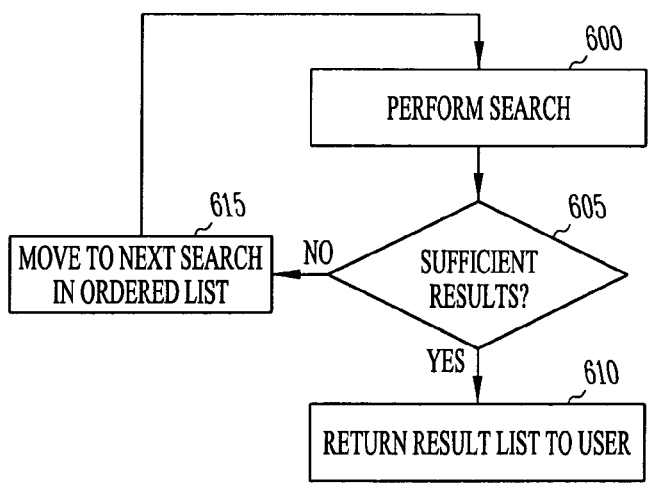
FIG. 6 is a flow chart illustrating generally one example of performing and evaluating individual searches.

In one example, individual searches are performed and evaluated, as illustrated in the flow chart of FIG. 6. The technique illustrated in FIG. 6 uses an ordered list of searches, S1, S2, S3 ..., SN. At 600, first search S1 is performed. Then, at 605, the corresponding results R1 are evaluated for sufficiency. In one example, at 605, if the number of documents returned in R1 is less than a threshold T1, the results R1 are deemed insufficient. In another example, if the number of documents returned in R1 is outside a range defined by a low threshold $T1_{low}$ and a high threshold $T1_{high}$, the results R1 are deemed insufficient.

If, at 605, the results R1 are sufficient, then at 610, a result list is returned to the user 420, after optionally ranking the results R1. Otherwise, if results R1 are deemed insufficient at 605, then at 615, the search process moves on to the next search in the ordered list, S2, which is then performed (or formulated and performed) at 600. At 605, the results of R2 are evaluated. In one example, this evaluation compares the number of documents returned by R1 and R2 to a threshold T2, which may, but need not, be a different value than threshold T1. In another example, this evaluation compares the number of documents returned only by R2 to a threshold T2, which may, but need not be a different value than threshold T1. In either case, threshold T2 may be implemented as a pair of thresholds $T2_{low}$ and $T2_{high}$ defining a desired range on the number of returned documents, as discussed above.

If, at 605, the particular comparison used indicates that sufficient documents were returned, then at 610, a result list is returned to the user 420, after optionally ranking the combined results of R1 and R2. Otherwise, if the results R1 and R2 are deemed insufficient at 605, then at 615, the search process moves on to the next search in the ordered list, S3, which is then performed at 600. This search process continues until either sufficient results are returned or the ordered list of searches is exhausted.

Because particular searches are formulated and/or performed based on an evaluation of the results obtained from one or more previous searches, the technique of FIG. 6 represents a dynamic search strategy. Moreover, the evaluation performed at 605 is not restricted to comparing the number of returned documents to one or more thresholds. Furthermore, the evaluation of the returned results performed at 605 is useful not only for determining whether to move to a subsequent search in the ordered list, but is also useful for determining which particular search in the ordered list should be performed next and/or how such a search should be formulated (such as which search terms should be used, which variations of the search terms should be deemed to match the search terms, which search criteria operators should be applied, etc.).

Moreover, in addition to the technique illustrated in FIG. 6, one or more factors other than the sufficiency evaluation at 605 may be used to interrupt the searching and/or return then-existing search results to the user without proceeding to the next search in the ordered list at 615. In one such example, if a timeout value is exceeded while performing the search, the then-existing search results are returned to the user. In one example, this timeout value is based on a real-time timer comparison to a predetermined real-time threshold value. In another example, this timeout value is based on a processing-time timer comparison to a predetermined processing-time threshold value.

Table 1, below, illustrates generally one example of a list of searches S1, S2, ..., SN ordered along a "textual" dimension. Table 2, below, illustrates generally one example of a list of searches S1, S2, ..., SN ordered along a "linguistic dimension. Table 3, below, illustrates generally one example of a list of searches S1, S2, ..., SN ordered along a "thesaurus" dimension. Other dimensions are also possible. In Table 3, "hypernym" refers to a more general or superclass (e.g., bone is a hypernym/superclass of tibia) of more particular terms.

TABLE 1

Example of Searches Ordered along a Textual Dimension

| Search Order | Search Criteria |
|---|---|
| S1 | Full match: the entire user's query is present as a phrase in the returned document(s) |
| S2 | Subphrase match: particular subphrase(s) in the user's query are present within the returned document(s) |
| S3 | "Near" match: all information-bearing terms (i.e., words or phrases) in the user's query are present within the returned document(s), and such terms are located near each other, but not necessarily contiguous |
| S7 | "And" match: all information-bearing terms in the user's query are present somewhere within the returned document(s) |
| . | . |
| . | . |
| . | . |
| SN | "OR" match: at least one information-bearing term in the user's query is present somewhere within the returned documents |

In one example, such as for search S3, terms are deemed "near" each other if they are within 10 words of each other in the document. In another example, such terms are deemed "near" each other if they are within 5 words of each other in the document. In a further example, which can be used alone or in combination with either above the above two criteria, terms are deemed "near" each other if occurring within the same sentence. In yet a further example, which can be used alone or in combination with either above the above two criteria, terms are deemed "near" each other if occurring within the same paragraph.

TABLE 2

Example of Searches Ordered along a Linguistic Dimension

| Search Order | Search Criteria |
|---|---|
| S1 | Textual Identity: terms from the user's query are present identically in the returned document(s) |
| S2 | Case Variation Allowed: terms from the user's query are present in the returned document(s), but casing (e.g., uppercase vs. lowercase) may vary from that appearing in the user's query |
| S3 | Case and Word Form Variation Allowed: terms from the user's query are present in the returned document(s), but casing and word forms may vary (e.g., using stemming to allow singular/plural variations, present/past tense variations, etc.) from that appearing in the user's query |
| S4 | Case, Word Form, and Phrasal Variation Allowed: terms from the user's query are present in the returned document(s), but casing, word forms, and phrasing may vary (e.g., allowing active/passive variations) from that appearing in the user's query |

TABLE 3

Example of Searches Ordered along a Thesaurus Dimension

| Search Order | Search Criteria |
|---|---|
| S1 | Identical term: terms from the user's query are present identically in the returned document(s) |
| S2 | Synonyms allowed: terms from the user's query, or terms having the same or nearly the same meaning as such terms from the user's query, are present in the returned document(s) |
| S3 | Synonyms and Hypernyms allowed: terms from the user's query, or terms having the same or nearly the same meaning as such terms from the user's query or having a broader meaning that encompasses such terms from the user's query, are present in the returned document(s). |

Although not a requirement, in each of Tables 1–3, the ordered list of searches proceeds generally along a particular dimension from a higher to a lower degree of specificity. This generally tends to yield documents that are more relevant to the user's query, and to exclude documents that are less relevant to the user's query. In the examples of Tables 1–3, each ordered list of searches could include additional searches that are similarly placed in that ordered list according to a perceived degree of specificity. Moreover, the searches need not be performed serially, as illustrated in FIG. 6. Alternatively, the searches are performed concurrently, with the search results evaluated serially or concurrently to determine which search results are presented (after any reranking) to the user 420.

In the examples of Tables 1–3, search criteria for each search dimension uses the language extracted from the user's query. However, other types of search criteria may also be used, and such other search criteria need not be extracted from the language of the user's input query. For example, for documents that are separated (e.g., using metadata tags) into particular portions (e.g., "Title," "Abstract," "Summary," "Details," etc.), different searches may be constrained to different portions of the documents. Such additional constraints may be organized into one or more additional ordered lists, providing corresponding additional dimensions to the searching. Table 4 provides a simplified illustrative example of searches organized along a dimension indicative of document portions.

TABLE 4

Example of Searches Ordered along a "Document Portions" Dimension

| Search Order | Search Criteria |
|---|---|
| S1 | Search Titles Only |
| S2 | Search Titles and Abstracts |
| S3 | Search Entire Document, Including Titles and Abstracts |

Although not a requirement, in Table 4, the ordered list of searches proceeds generally along a particular dimension from a higher to a lower degree of specificity. This generally tends to yield documents that are more relevant to the user's query, and to exclude documents that are less relevant to the user's query. In the example of Table 4, the ordered list of searches could include additional searches that are similarly placed in the ordered list according to a perceived degree of specificity. Moreover, the searches need not be performed serially, but could be performed concurrently, with the search results evaluated serially or concurrently to determine which search results are presented (after any reranking) to the user 420.

Figure 7:
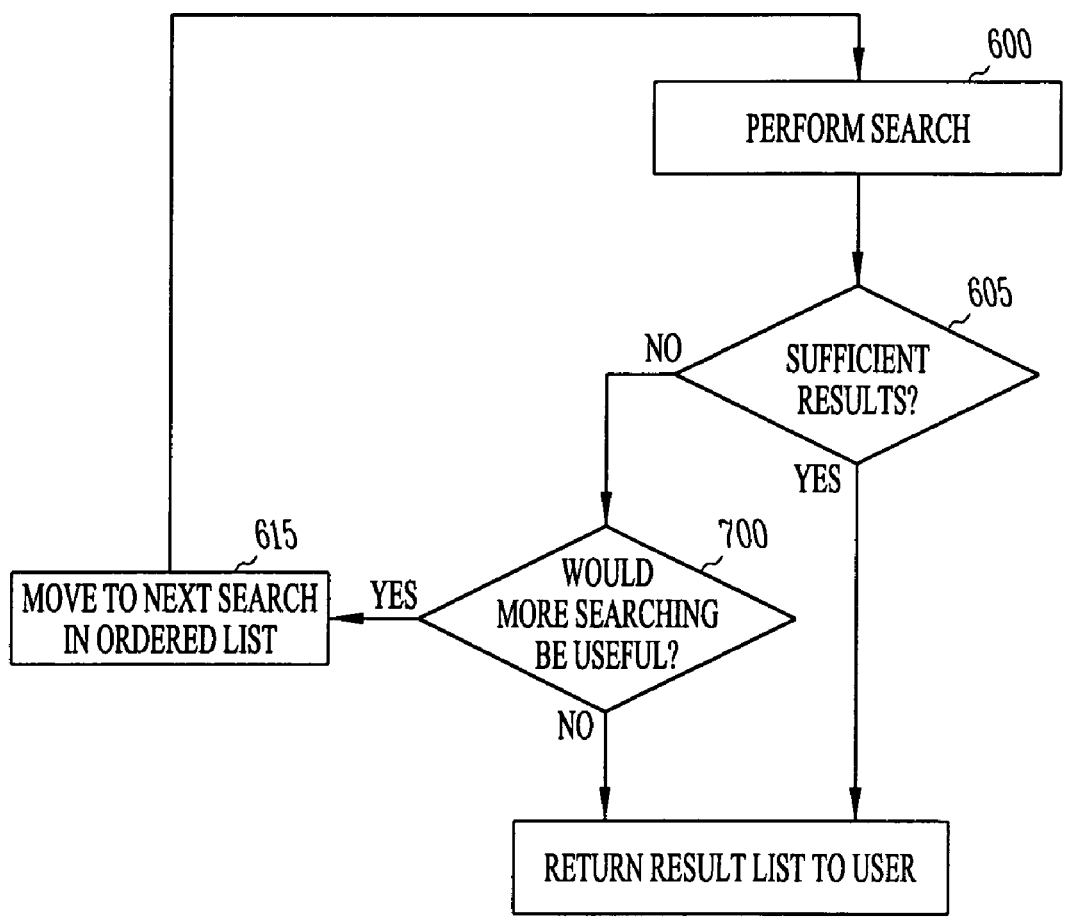
FIG. 7 is a flow chart that adds a step to the techniques discussed with respect to FIG. 6.

FIG. 7 is a flow chart that adds step 700 to the techniques discussed above with respect to FIG. 6. In FIG. 7, after performing a search at 600, if, at 605, the search results are determined to be insufficient, then, at 700, a determination is made as to whether further searching would likely be useful or whether it would add to the usefulness of the then-existing search results. If further searching would likely not add value to the then-existing search results, the then-existing search result list is returned to the user, at 610. If, at 700, further searching would likely add value to the then-existing search results, then at 615 the process moves on to the next search in the ordered list, which is then performed at 600.

One technique of determining whether more searching would be useful uses the ability of search engine 410 to return search results that include hit counts for individual search terms as well as the total hit count for the search terms as combined using the search criteria's specified operators (such as the text operators "NEAR," "AND," "OR", etc.). In one illustrative example, a user query includes two terms "A" and B." In this example, the last search performed, at 600, is "'A' AND 'B'". In performing this search, search engine 410 indicates that the number of documents satisfying "'A' AND 'B'" is three documents, which is less than a low threshold $T1_{low}=5$ documents. However, search engine 410 also indicates that term "A" is found in 10,000 documents and term "B" is found in 5,000 documents. If the next search to be performed is "'A' OR 'B'", it is already known that performing such a search would return about 15,000 documents, which exceeds a high threshold $T1_{high}=500$ documents. Therefore, in this example, performing the next search, "'A' OR 'B'" is deemed not useful because it would tend to bury the three likely more relevant documents in many more likely less relevant documents (although this result could be mitigated somewhat by displaying the likely more relevant documents earlier in the result list than the likely less relevant documents). Thus, in this example, the then-existing result list of three documents is returned to the user, at 610, without performing the next search, "'A' OR 'B'". Similarly, other rules may be applied at 700 to indicate whether one or more subsequent searches should be deemed as likely not increasing the usefulness of the then-existing search results, which are then returned to the user, at 610, without performing the one or more subsequent searches in the ordered list.

Examples Using Multiple Search Dimensions And/Or Search Terms

In a further example, two or more search dimensions (such as those discussed in this document or any other suitable search dimensions), are combined into a multidimensional data search. In one such an illustrative example, the search dimensions of Tables 1 and 2 are combined into a multidimensional dynamic data search, Sij, where i indexes the list of search criteria of Table 1, and j indexes the list of search criteria of Table 2. The combined search may be performed along the two dimensions, analogous to moving from column to column and from row to row in a two-dimensional matrix or, alternatively, may be performed in any other arbitrary order. The multidimensional dynamic data search may similarly be expanded beyond two dimensions to include other dimensions as well, such as the dimensions of Tables 3 and 4. One example of another possible dimension providing additional search criteria uses constraints to particular subset(s) of the documents obtained through an interactive dialog session with the user 420. In one such example, all dialog constraints are initially used, but if the results are deemed insufficient, a partial set of dialog constraints is then used. If the combined results are found insufficient, then no dialog constraints are used, etc.

As discussed above, for a single search dimension, the ordered list of searches proceeds generally along a particular dimension from a higher to a lower degree of specificity, tending generally to yield documents that are more relevant to the user's query, and to exclude documents that are less relevant to the user's query. However, when multiple search dimensions are combined, it becomes difficult to precisely specify an order of performing searches that proceeds exactly from more general to more specific. This effect is exacerbated as the number of search terms increases beyond two terms to several-even many-search terms.

As an illustrative example, for the two term query "sql server," searches along just the "textual" dimension of Table 1 may proceed as:
S1: "sql server"
S2: "sql" NEAR "server"
S3: "sql" AND "server"
S4: "sql" OR "server"

In this example, S1 through S4 are nicely ordered, most specific to most general, and the more general searches will return all the documents that the more specific searches will return, and may return more documents. Adding search terms or dimensions, however, may not yield results that are ordered exactly from more specific to more general. As an illustrative example, for the three term query "sql server crashes," searches along just the "textual" dimension of Table 1 may proceed as:
S1: "sql server crashes"
Sa: "sql" NEAR "server" NEAR "crashes"
Sb: ("sql" NEAR "server") AND "crashes"
Sc: "sql" AND ("server" NEAR "crashes")
Sd: ("sql" NEAR "server") OR "crashes"
Se: "sql" OR ("server" NEAR "crashes")
Sf: ("sql" AND "server") OR "crashes"
Sg: "sql" OR ("server" AND "crashes")
Sh: "sql" AND "server" AND "crashes"
Si: "sql server" NEAR "crashes"
Sj: "sql" NEAR "server crashes"
Sk: "sql server" AND "crashes"
Sl: "sql" AND "server crashes"
Sm: "sql server" OR "crashes"
Sn: "sql" OR "server crashes"
Slast: "sql" OR "server" OR "crashes"

In this example, a particular search may not necessarily yield more documents, or more relevant documents, than an immediately preceding search. Search "S1" is more specific than all the others, and search "Slast" is more general, but in between there is only approximate ordering from more specific to more general. In this example, search "Sc" is more general than searches "Sa" and "Sl," and more specific than searches "Se" and "Sh." However, search "Sc" is not necessarily more specific or more general than searches Sb, Sd, Sk, etc.

Similarly, in another example, a two term query of "sql server" along both "textual" and "linguistic" dimensions also yields only approximate ordering from more specific to more general, as illustrated below:
S1: identity "sql server" (e.g., would match "sql server" only)
Sa: allow case variation "sql server" (e.g., would match "SQL server")
Sb: allow case and word form variation "sql server" (e.g., would match "SQL servers")
Sc: allow case, word form, and phrase variation "sql server"" (e.g., would match "servers for SQL")
Sd: identity of ("sql" NEAR "server")
Se: allow case variation of ("sql" NEAR "server")
Sf: allow case and word form variation of ("sql" NEAR "server")
Sg: allow case, word form, and phrase variation of ("sql" NEAR "server")
Sh: identity of ("sql" AND "server")
Si: allow case variation of ("sql" AND "server")
Sj: allow case and word form variation of ("sql" AND "server")
Sk: allow case, word form, and phrase variation of ("sql" AND "server")

Sl: identity of ("sql" OR "server")

Sm: allow case variation of ("sql" OR "server")

Sn: allow case and word form variation of ("sql" OR "server")

So: allow case, word form, and phrase variation of ("sql" OR "server")

In this example, S1, Sa, Sb, Sc, Sg, Sk, and So are ordered from more specific to more general. However, Si cannot be placed exactly within the ordering according to specificity—Si should be placed before Sk, but it is neither more specific nor more general than Sb. Applying linguistic variations to individual terms will further confound ordering according to specificity. Adding more dimensions or terms will compound this effect.

As illustrated by the above example, for a search using multiple search dimensions, the number of documents returned may not necessarily increase monotonically as searches are performed in the search order, even if the search order is designed as to approximate searching from a higher degree of specificity to a lower degree of specificity. Such an approximation can be obtained by establishing the search order arbitrarily (e.g., based on empirical test data) or algorithmically, as discussed below with respect to FIG. 8. Even when a particular search does return more documents than a preceding search, all the results from the preceding search will not necessarily be contained in the result set of that particular subsequent search. In one example, after the results are deemed sufficient (or all searches are exhausted) the results of searches performed thusfar are combined, ranked by results ranking engine 415, and presented to the user (after eliminating duplicate returned documents). In one example of ranking by results ranking engine 415, results from a more specific search are ranked higher than results from a more general search, with duplicative results appearing in both such searches eliminated from the more general searches results. Documents returned by the same search can be ranked according to any suitable ranking algorithm including, for example, a ranking algorithm provided by search engine 410. In another example of ranking by results ranking engine 415, the particular search returning a particular document is used as one of several factors that determine the documents rank. Other possible factors for ranking the documents include hit count, tag weight of the document to particular concept nodes deemed relevant to the user's query, etc.

Figure 8:
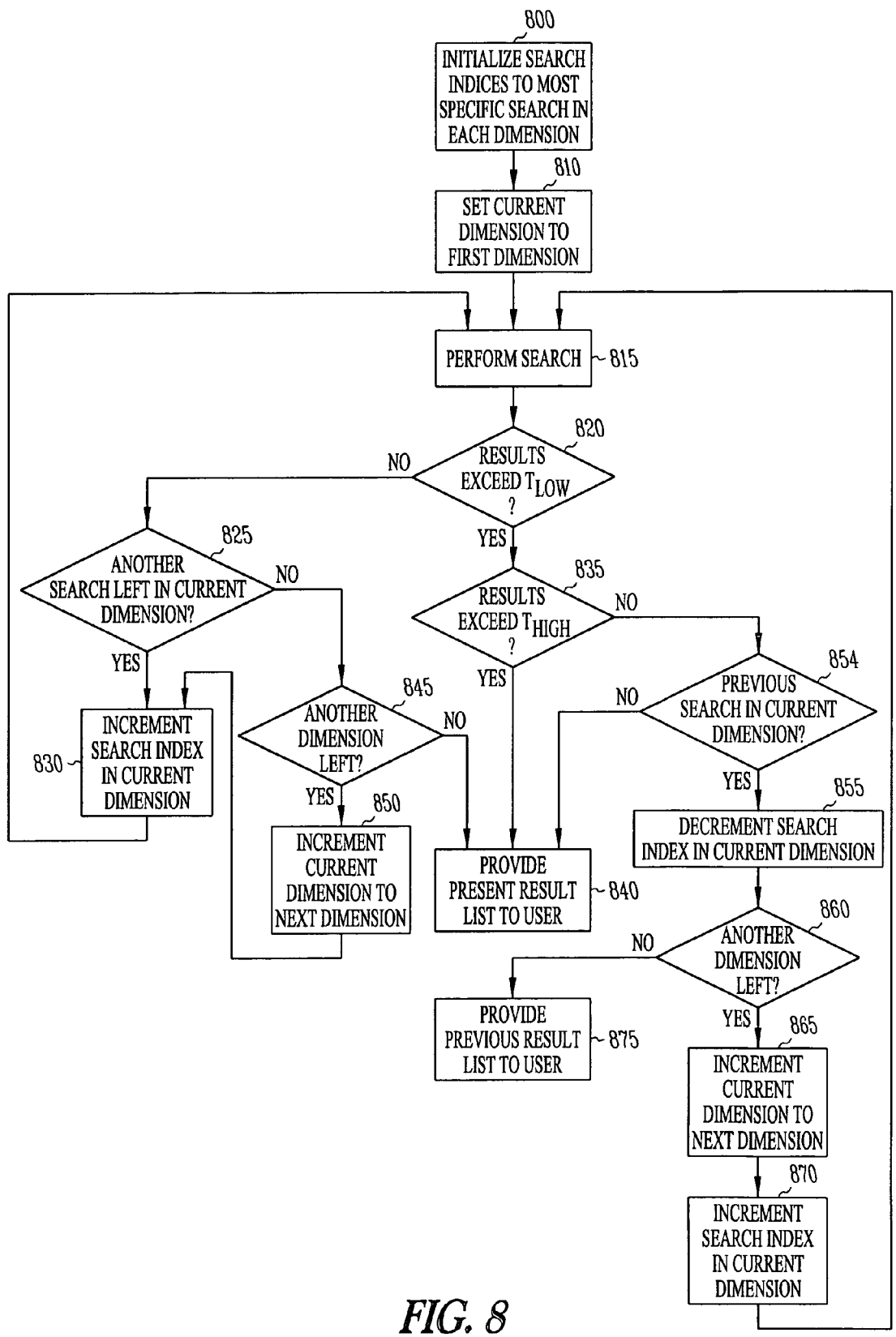
FIG. 8 is a flow chart illustrating generally one algorithmic approach for searching along multiple dimensions.

FIG. 8 is a flow chart illustrating generally one algorithmic approach for searching along multiple dimensions. For illustrative purposes, the flow chart of FIG. 8 is described in conjunction with a three-dimensional search matrix, $S_{ijk}$, where the subscript i indexes a designated "primary" dimension of x number of searches arranged, in that dimension, from most specific to most general, the subscript j indexes a designated "secondary" dimension of y number of searches arranged, in that dimension, from most specific to most general, and the subscript k indexes a designated "tertiary" dimension of z number of searches arranged, in that dimension, from most specific to most general. However, the technique illustrated in FIG. 8 is not limited to three dimensions; it applies to any number of dimensions. In FIG. 8, at 800, the indices are initialized to correspond to their most specific search, within their respective search dimension (i.e., $S_{111}$). At 810, a current dimension variable ("CD"), along which searching will be stepped, is initialized to the primary dimension, i.e., CD=1.

After this initialization, at 815 a search is performed using the search criteria, which at this point is specified by $S_{111}$. At 820, the number of documents returned by the search is compared to the low threshold, $T_{LOW}$. If number of documents returned is less than the low threshold, then the search just performed was too specific. Accordingly, at 825, if there is another search left along the current dimension (which, at this point, is still the primary dimension), then current dimension's index is incremented at 830. In this example, at 830, this moves to a more general new search specified by $S_{211}$, which is then performed at 815.

Again, at 820, the number of documents returned by the search is compared to the low threshold, $T_{LOW}$. If number of documents returned is greater than the low threshold, then, at 835, the number of documents returned is compared to the high threshold, $T_{HIGH}$. If the number of documents returned is less than the high threshold, then, at 840, a result list corresponding to the just executed search (which, at this point in this example, is specified by $S_{211}$) is returned to the user, and no further searching is performed. However, if, at 820, the number of documents returned by search $S_{211}$ is again less than the low threshold, and, at 825, no other searches are left along the primary dimension (e.g., in this example, x=2), then process flow moves to 845 to determine whether there is another dimension left for searching.

In this example, although all searches in the primary dimension has been exhausted, the secondary and tertiary dimensions remain at this point. Therefore, process flow moves to 850, where the current dimension is incremented to the secondary dimension (i.e., CD=2), and to 830, where the current dimension index is incremented (i.e., the search specification becomes $S_{221}$). Process flow then moves to 815 to perform the search (which, at this point in the example is specified by $S_{221}$). At 820, if the search specified by $S_{221}$, fails to yield the low threshold number of documents, and all searches in the secondary dimension is not yet exhausted, as determined at 825, then the secondary index is incremented at 830, so that the search specified by $S_{231}$ is then performed at 815.

In this example, if the search specified by $S_{231}$ exceeds the low threshold at 820, but does not exceed the high threshold at 835, then the results of the just-executed search $S_{231}$ are presented to the user at 840, after any combining, ranking and/or elimination of duplicates.

If, however, the search specified by $S_{231}$ exceeds both the low threshold at 820 and the high threshold at 835, then the just-executed search $S_{231}$ is too general and the preceding search $S_{221}$ was too specific. In that case, process flow proceeds from 835 to 854. If, at 854, there is no previous search in the current dimension, then the result list (or a portion thereof, since the number of documents exceeds the high threshold) is presented to the user at 840). If, at 854, there is a previous search in the current dimension, then the search index of the current dimension is decremented, at 855, to $S_{221}$. Then, at 860, it is determined whether another dimension remains for searching. At this point in this example, because the tertiary dimension still remains available for searching, process flow continues from 860 to 865, where the current dimension is incremented to the tertiary dimension (i.e., CD=3), and to 870, where the current dimension index is incremented (i.e., the search specification becomes $S_{222}$). Process flow then moves from 870 to 815 to perform the search specified by $S_{222}$.

In this example, if the search specified by $S_{222}$ exceeds the low threshold at 820, but does not exceed the high threshold at 835, then the results of the just-executed search $S_{222}$ are presented to the user at 840, after any combining, ranking and/or elimination of duplicates. If, however, the search specified by $S_{222}$ exceeds both the low threshold at 820 and the high threshold at 835, then the just-executed search $S_{222}$ is too general and the preceding search $S_{221}$ was too specific. In that case, process flow proceeds from 835 to 855. The search index of the current dimension is decremented, at 855, to $S_{221}$. At 860, because all dimensions (primary, secondary, and tertiary, in this example) are exhausted, process flow moves from 860 to 875, where stored results of the search that preceded the just-executed search are provided as a result list to the user. At this point in this example, the just-executed search is specified by $S_{222}$, and the preceding search is specified by $S_{221}$, therefore, at 875, the results of the search specified by $S_{221}$ are presented to the user, after any combining, ranking and/or elimination of duplicates.

In FIG. 8, at 820 and 835 the number of returned documents are compared to respective low and high thresholds. However, multiple searches in the search order may return some of the same documents. Therefore, in one example, the comparisons to the low and/or high thresholds uses the raw number of returned documents reduced by the number of duplicate documents. In an alternative example, the comparisons to the low and/or high thresholds uses the raw number of returned documents returned by all searches performed thusfar. Also, in FIG. 8, at 875, the returned documents exceed the high threshold, and therefore the previous result list is presented to the user (after any combining, ranking, and/or elimination of duplicates). Alternatively, however, the present result list is presented to the user at 875 (after any combining, ranking, and/or elimination of duplicates).

The examples discussed above with respect to FIGS. 6–8 illustrate generally techniques for proceeding along a single search dimension, from more specific to more general, and along multiple dimensions, in an approximation of searching from more specific to more general. In a further example, although searches are ordered (in a single or multidimensional search space) at least approximately from more specific to more general, these searches are performed out of order. In one such example, the searches are performed using a binary or similarly styled division of the search space. In contrast to the example illustrated in FIG. 8, which starts at a most specific search and proceeds as illustrated in FIG. 8, a binary technique could start in the middle of the search space. If the search yields a number of documents within a specified range, the results are returned to the user. If the search yields too few documents, the search space is then restricted to the searches that are designated as more general than the initial search. If the search yields too many documents, the search space is then restricted to the searches that are designated as more specific than the initial search. In either case, a search in the middle of the newly restricted search range is then performed. In this manner, a binary "divide and conquer" strategy is used to choose the order in which searches are performed. Traversing the search space in a binary manner may be faster at yielding the desired results, at least in the aggregate over a number of different user queries. Other "divide and conquer" strategies may also be used; the search space need not be divided in exactly a binary manner. For example, the system designer may have a priori knowledge, or intuition, as to the effectiveness of particular searches as compared to other searches. In such a case, the designer could specify a different division of the search space, such as to reduce search time and/or improve the quality of search results.

Examples Using Search Dimension(s) And/Or Ordering Based on User Query

Figure 9:
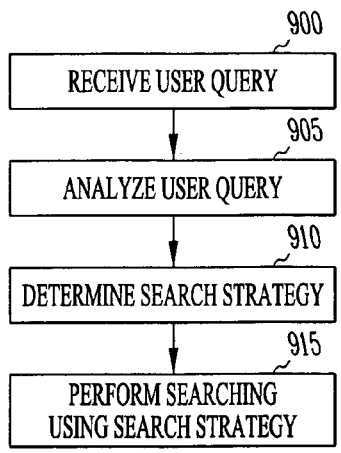
FIG. 9 is a flow chart illustrating generally an example of a technique of using information in the user query to determine the nature of searching to be performed.

FIG. 9 is a flow chart illustrating generally an example of a technique of using information in the user query to determine the nature of searching to be performed. In one example, the technique illustrated in FIG. 9 is performed by one or more modules included in query generator 405. In FIG. 9, at 900, content provider 100 receives the user's query, which includes text or some other language-based expression. At 905, query generator 405 analyzes the user's query. At 910, query generator 405 determines an appropriate search strategy based at least in part on the analysis of the user query at 905. In one example, this search strategy determination includes selecting (or omitting) one or more search dimensions based at least in part on the user query. In another example, this search strategy determination includes selecting (or omitting) particular searches within the one or more search dimensions based at least in part on the user query. In a further example, this search strategy determination includes ordering particular searches—within a search dimension, or selected from multiple search dimensions—based at least in part on the user's query. In yet another example, this search strategy determination includes ordering a plurality of search dimensions based at least in part on the user's query. In yet a further example, this search strategy determination includes determining how a particular ordering of searches and/or dimensions is traversed during execution (e.g., whether the ordered list is traversed incrementally, or in a binary or other divide-and-conquer fashion). At 915, searching is performed using the search strategy determined at 910.

Figure 10:
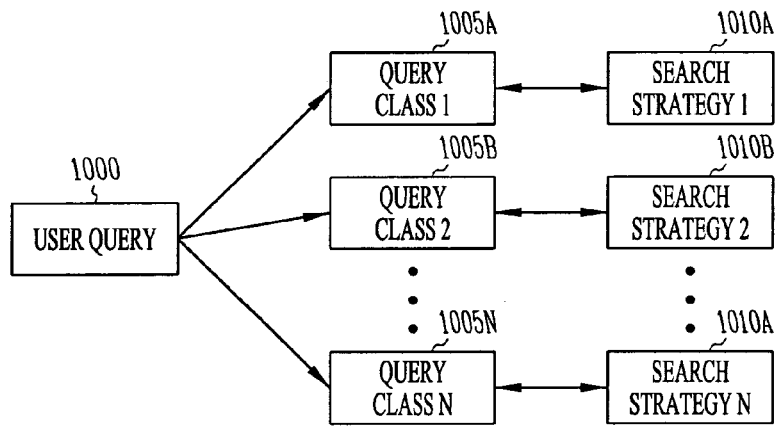
FIG. 10 is a schematic illustration that further describes one example of certain aspects of the process illustrated in FIG. 9.

FIG. 10 is a schematic illustration that further describes one example of certain aspects of the process illustrated in FIG. 9. Analyzing the user query 1000 typically includes extracting information-bearing terms (i.e., information-bearing words or phrases) and noninformation-bearing terms (e.g., stopwords such as "of" or "the" not appearing within an information-bearing phrase). In one example, this analysis also includes using such information to classify user query 1000 into a particular query class 1005A–N, and/or to determine one or more characteristics for performing a search on that particular form of user query 1000. In an illustrative example, a first query class 1005A includes user queries having a single term, a second query class 1005B includes user queries having two terms, etc. Multiple query classifications may, of course, be merged into a single query class. Each query class 1005A–N includes a corresponding search strategy 1010A–N. Each search strategy 1010A–N includes one or more dimensions, in a particular order, and one or more searches in each dimension, in a particular order with respect to any other searches in that dimension or lumped together in an order with searches from other dimensions. In one example, the search strategies 1010A–N are expressed explicitly (e.g., using a look-up table or other suitable technique). In another example, the search strategies 1010A–N are implemented as one or more rules and/or algorithms that affect dimension(s), ordering of dimensions, search(es) in a dimension, and/or ordering of search(es) either in a particular dimension or together with search(es) from other dimensions.

In one example, the classification of user queries 1000, the search strategies 1010A–N, and/or one or more other user-query dependent search characteristics are drawn from actual user queries 1000 drawn from a query log maintained by content provider 100. In one such technique, the query log records, for each actual user query 1000, which searches were performed and how many documents were returned by each search that was performed. The query log may additionally track which documents were returned, so that a human knowledge engineer can use human judgment to evaluate the quality of the documents (e.g., relevance and selectivity) that were returned for each search. This evaluation may also be automated in whole or in part. Moreover, in a further example, the classification of user queries 1000, the search strategies 1010A–N, and/or one or more other user query dependent search characteristics is created, performed, or modified during normal use of content provider 100, such as after each user query 1000, after a specified number of user queries 1000, or at periodic or occasional time intervals.

In addition to classifying the user queries 1000, as discussed above (or in lieu of, or as part of such classifying), the user query 1000 may also be examined to generate one or more other user query dependent search characteristics. In one example, this includes determining a characteristic of a search strategy based at least in part on information included within the user query 1000. For an illustrative example, suppose a particular user query has three information-bearing terms, one of which is an acronym, such as a user query of "TCP/IP failed connection." In one embodiment, this triggers application of a "keep the acronym" preference or rule for performing searches, such as along a textual dimension, as discussed above with respect to Table 1.

In an embodiment in which "keep the acronym" is applied as a rule, a text search of "'TCP/IP' AND ('failed' NEAR 'connection')" would be included in the search strategy, but a text search of "'TCP/IP' OR ('failed' NEAR 'connection')" would be omitted from the search strategy, because the former would return only documents that include the acronym "TCP/IP," while the latter would potentially return documents that do not include the acronym "TCP/IP." In an embodiment in which "keep the acronym" is applied as a preference, both of these searches would be included, but the ordering of these searches would be specified to ensure that the "'TCP/IP' AND ('failed' NEAR 'connection')" is executed before "'TCP/IP' OR ('failed' NEAR 'connection')." Other examples include similar rules or preferences such that, for example, part numbers are either kept or preferred to other nouns, product names are either kept or preferred to other objects, nouns are either kept or preferred to verbs, verbs are either kept or preferred to adjectives, or certain particularly-identified parts of speech in the user's query are kept or preferred to other parts of speech by appropriately selecting or ordering one or more particular searches using particular search criteria.

Although FIG. 9 illustrates an example of a particular sequence of analyzing a user query at 905, determining a search strategy at 910 based on the analysis at 905, and performing searching at 915 using the search strategy established at 910, other sequences are also possible. For example, FIGS. 5 and 6 illustrated dynamic search techniques in which the results of a particular search are used, among other things, to determine whether more searching would be useful. In a further example, the results of a particular search are also used to determine a strategy for subsequent searching, such as, for example, by selecting dimension(s), ordering of dimensions, selecting search(es) in a particular dimension, and/or ordering of search(es) either in a particular dimension or together with search(es) from other dimensions.

Figure 11:
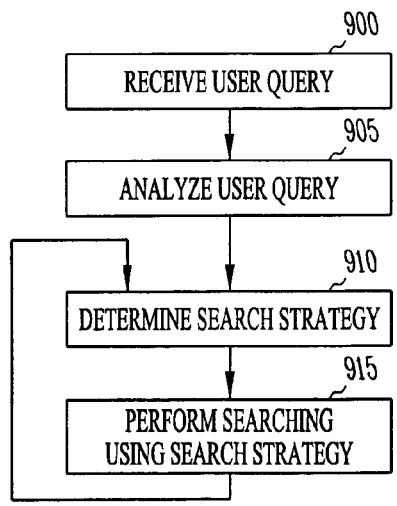
FIG. 11 is a flow chart, similar to FIG. 9, but illustrating generally one example of determining a search strategy based at least in part on results of previous searching.

FIG. 11 is a flow chart, similar to FIG. 9, but illustrating generally one example of determining a search strategy based at least in part on results of previous searching. In one example, such search strategy determination includes selecting (or omitting) searches and/or dimensions, ordering searches and/or dimensions, and/or determining how the ordered list of searches and/or dimensions is traversed, such as discussed above with respect to FIG. 9.

For example, as discussed above, one technique of determining whether more searching would be useful uses the ability of search engine 410 to return search results that include hit counts for individual search terms in the user query as well as the total hit count for the search terms as combined using the search criteria's specified operators (such as the text operators "NEAR," "AND," "OR", etc). At least one example of using hit counts for individual search terms was discussed above in this document. In a further example, hit counts for individual search terms is used to actually reclassify a query from one query class 1005A–N to a different query class 1005A–N. For example, if a user query 1000 has two information-bearing terms, and is classified accordingly, if an initial search indicates that one of these terms does not appear in any documents, in one example, the user query is then reclassified as a single term query. Accordingly, in this example, subsequent searching is then carried out according to the search strategy mapped to a single term query class of query classes 1005A–N.

As these examples, and FIG. 11, illustrate, the selection (or omission) of particular searches and/or dimensions, ordering searches and/or dimensions, and/or determining how the ordered list of searches and/or dimensions is traversed need not (but may) be predefined entirely before the searches are executed. As an alternative to predefining the search strategy before execution of any searches, the search strategy is formulated and/or modified "on the fly," such as based on at least one previous result. In certain instances, such dynamic formulation and/or modification of the search strategy offers an advantage over a predefined search strategy. For example, a predefined search ordering may proceed only approximately, but not exactly, from more specific to more general, as discussed above with the example of the three term query "sql server crashes," along the "textual" dimension of Table 1. Where a search engine returns a first search that includes a hit count for individual search terms, in one example, the number of documents returned by Boolean combinations of such terms is calculable for subsequent searches to be performed. In this example, therefore, the subsequent searches are strictly (rather than approximately) ordered from more specific to more general, at least along a particular (e.g., textual) dimension (although successive searches may, in some instances, manifest equivalent specificity). In an alternative example, the searches are not ordered exactly according to specificity, but the hit count or other information obtained from a previously executed search is used to improve the ordering, such as with respect to specificity, or with respect to performance requirements.

Example of Query Classes and Corresponding Search Strategies

In one example, but not by way of limitation, four particular query classes 1005 and corresponding search strategies are used. In this example, the query classes are: (1) single term queries; (2) short (i.e., 2 to 3 term) queries; (3) long single-phrase queries; and (4) long (i.e., more than 3 terms) queries. These query classes and their corresponding searches are discussed further below.

1. Single Term Query. A single term user query (e.g., a user query of: "connect"), in this example, triggers searching ordered as follows. First, search for the term ("connect") in important document regions (e.g., a "Title" portion or an "Abstract" portion of the documents, or other portion(s) designated as important). In this example, casing variations are allowed (e.g., documents containing "connect" or "Connect" in the "Title" or "Abstract" are returned). If this search yields insufficient results, then, second, search the same document regions for the term, allowing both casing and word form variations, such as by using stemming (e.g., documents containing "connect," "Connects," "connecting," "Connectivity," etc. in the "Title" or "Abstract" are returned). If this search yields insufficient results, then, third, search all document regions for the term ("connect") allowing casing variations (e.g., documents containing "connect" or "Connect" anywhere in the document are returned). If this search yields insufficient results, then fourth, search all document regions for the term, allowing casing and word form variations (e.g., documents containing "connect," "Connects," "connecting," "Connectivity," etc. anywhere in the document are returned). If this search yields insufficient results, then, fifth, search all document regions for the term, allowing casing variations and synonyms of the term (e.g., documents containing "connect," "Connect," "link," "Link," etc. anywhere in the document are returned).

2. Short User Query. A short user query (e.g., a user query of "internet connection failure"), in this example, triggers searching ordered as follows. First, search for all terms appearing together as a phrase (e.g., "internet connection failure") in the important document regions, allowing casing variations (e.g., documents containing "internet connection failure," "Internet Connection failure," etc. in the "Title" or "Abstract" are returned). If this search yields insufficient results, then, second, search all document regions for all terms appearing together as a phrase, allowing casing variations (e.g., documents containing "internet connection failure," "Internet Connection failure," etc. anywhere in the document are returned). If this search yields insufficient results, then, third, search all document regions for all terms being located near each other, allowing casing variations (e.g., documents containing "'internet' NEAR 'Connection' NEAR 'failure'", etc., anywhere in the document are returned). If this search yields insufficient results, then, fourth, search all document regions for all terms, allowing casing variations (e.g., documents containing "'internet' AND 'Connection' AND 'failure'", etc., anywhere in the document are returned). If this search yields insufficient results, then, fifth, search all document regions for all terms, allowing casing and word form variations (e.g., documents containing "'internet' AND ('Connection' OR 'connects' OR 'connectivity,' etc.) AND ('failure' OR 'fails' or 'failing,' etc.)", etc., anywhere in the document are returned). If this search yields insufficient results, then, sixth, (for a three-term short user query) search all document regions for any in-sequence pairs of terms, allowing casing variations (e.g., documents containing "internet connection," "connection failure," "Internet connection," "Connection Failure," etc. anywhere in the document are returned). If this search yields insufficient results, then, seventh, search all document regions for any term, allowing casing variations (e.g., documents containing "internet" or "connection" or "failure" or "Internet" or "Connection" or "Failure" anywhere in the document are returned).

3. Long Single-Phrase Query. A long single-phrase query includes more than three information-bearing terms without any accompanying stopwords (e.g., a user query of "internet virus macro hard disk"). These kind of queries tend to be asked when the user expects a Boolean "AND" operator to be applied to the words; there is typically no apparent linguistic connection between the words, but the user is hoping to pin-point a set of documents that contains all of the words. A long single-phrase user query, in this example, triggers searching ordered as follows. First, search all document regions for all terms being located near each other, allowing casing variations (e.g., documents containing "'internet' NEAR 'virus' NEAR 'macro' NEAR 'hard' NEAR 'disk'" anywhere in the document are returned, regardless of the casing of these terms). If this search yields insufficient results, then, second, search all document regions for all terms, allowing casing variations (e.g., documents containing "'internet' AND 'virus' AND 'macro' AND 'hard' AND 'disk'" anywhere in the document are returned, regardless of the casing of these terms). If this search yields insufficient results, then, third, search all document regions for all terms, allowing casing and word form variations (e.g., documents containing "'internet' AND ('virus' OR 'viruses') AND ('macro' OR 'macros') AND 'hard' AND ('disk' OR 'disks')" anywhere in the document are returned, regardless of the casing of these terms). If this search yields insufficient results, then, fourth, methodically search all document regions for subsets of all terms, for example, search for all but one term appearing in the same document. In this example, for a user query of "internet virus macro hard disk," this includes searching as follows:

"('internet' AND 'virus' AND 'macro' AND 'hard'") OR
('internet' AND 'virus' AND 'macro' AND 'disk') OR
('internet' AND 'virus' AND 'hard' AND 'disk') OR
('internet' AND 'macro' AND 'hard' AND 'disk') OR
('virus' AND 'macro' AND 'hard' AND 'disk')

in all portions of the documents, regardless of the casing of these terms. If this search yields insufficient results, then, fifth continue searching all document regions for subsets of all terms, but decrease the subset size, for example, to search for all but two terms appearing in the same document, etc. If this technique of searching continues to yield insufficient results, then ultimately, it results in searching for any one term in all portions of the documents (e.g., "'internet' OR 'virus' OR 'macro' OR 'hard' OR 'disk'"), regardless of the casing of any of these terms.

4. Long Query. A long query includes more than three information-bearing terms, but also includes one or more stopwords. Thus, a long query is more likely to represent a "natural language" type of a query from a user (e.g., "trouble with internet connectivity after infecting hard disk with nimda virus"). A long query triggers searching, as described below, but the stop words are first removed (e.g., "trouble with internet connectivity after infecting hard disk with nimda virus" is translated into a four term query—(1) "trouble," (2) "internet connectivity," (3) "infecting hard disk," (4) "nimda virus"). In this example, a long query triggers searching ordered as follows. First, search all portions of the documents for the user query itself, including stop words, but allowing casing variations (e.g., documents containing "trouble with internet connectivity after infecting hard disk with nimda virus" are returned, regardless of the casing of these words in the documents). If this search yields insufficient results, then, second, search all portions of the documents for all terms appearing in the document (e.g., documents containing "'trouble' AND 'internet connectivity' AND 'infecting hard disk' AND 'nimda virus'" anywhere in the document are returned, regardless of the casing of the words in these terms). If this search yields insufficient results, then, third, search all document portions for all terms, but allow each term to be deemed satisfied by a subphrase of that term. This includes methodically stepping through the combinations of possible subphrases within the terms by iteratively forming each subphrase with one fewer word of that term on each iteration. In this example, for a user query of "trouble with internet connectivity after infecting hard disk with nimda virus," which has been translated into the four terms: (1) "trouble," (2) "internet connectivity," (3) "infecting hard disk," (4) "nimda virus," the third search proceeds as follows:

A. "'trouble' AND ('internet' OR 'connectivity') AND ('infecting hard' OR 'hard disk') AND ('nimda' OR 'virus')," in all portions of the documents, regardless of the casing of these terms, and if this yields insufficient results, then B. "'trouble' AND ('internet' OR 'connectivity') AND ('infecting' OR 'hard' OR 'disk') AND ('nimda' OR 'virus')," in all portions of the documents, regardless of the casing of these terms.

If this yields insufficient results even after each term has been reduced to its constituent words, to which Boolean "OR" operators are applied, then, fourth, the techniques of the third search are repeated, but allowing word form variations as well as casing variations. If this yields insufficient results, even after each term has been reduced to its constituent words and word form variations, to which Boolean "OR" operators are applied, then, fifth, search all document portions for any complete term (e.g., documents containing "'trouble' OR 'internet connectivity' OR 'infecting hard disk' OR 'nimda virus'" anywhere in the document are returned, regardless of the casing of the words in these terms). If this search yields insufficient results, then, sixth, search all document portions for any terms, and allow each term to be deemed satisfied by a subphrase of that term. This includes methodically stepping through the combinations of possible subphrases within the terms by iteratively forming each subphrase with one fewer word of that term on each iteration. In this example, for a user query of "trouble with internet connectivity after infecting hard disk with nimda virus," which has been translated into the four terms: (1) "trouble," (2) "internet connectivity," (3) "infecting hard disk," (4) "nimda virus," the sixth search proceeds as follows:

A. "'trouble' OR 'internet' OR 'connectivity' OR 'infecting hard' OR 'hard disk' OR 'nimda' OR 'virus'," in all portions of the documents, regardless of the casing of these terms, and if this yields insufficient results, then B. "'trouble' OR 'internet' OR 'connectivity' OR 'infecting' OR 'hard' OR 'disk' OR 'nimda' OR 'virus'," in all portions of the documents, regardless of the casing of these terms. Thus, in the sixth search, eventually the user query is reduced to its constituent words (without stopwords), to which Boolean "OR" operators are applied.

Four the above four query classes, the corresponding search strategy may vary depending on, among other things, the particular content provider 100 and its content body 115, the user base of content provider 100, and/or the particular search engine 410 used by content provider 100. In one example, such determinations are based on data from customer query logs maintained by the content provider 100 of previous user sessions. In the above example of the four search strategies corresponding to the four query classes, each strategy includes searches that proceed at least approximately from more specific to more general. The choice of particular searches is, in one example, determined by performing such searches on previous user queries, of the same query class, as maintained in the query logs, so that the searches approximately proceed from more specific to more general in steps that are not "too large" or "too small." This may vary from between content providers 100, their user bases, content bases 115, etc. In one example, offered by way of illustration, and not by way of limitation, moving from an "AND" of three terms to an "OR" of three terms may be too large of a step for a particular content base 115. In a similar illustrative example, moving from an "AND" of three words to an "AND" of three words but allowing word form variations of the last of the three terms may be too small of a step for a particular content base 115.

The determination of whether steps loosening search specificity are "too large" or "too small" is, in one example, based at least in part on the hardware, software, and/or content performance of a particular content provider 100, its search engine 410, and/or its content base 115. If performance requirements indicate that the content provider should return a minimum of N documents within a predetermined time limit, then the number of searches, M, that search engine 410 can perform for its corresponding content base 115 within the predetermined time limit may be limited. In one example, therefore, the search strategy is adjusted based at least in part on the number of searches that can be performed in an acceptable amount of time. The above example of four query classes and corresponding search strategies is believed to offer acceptable performance, based on empirical testing of logged user queries on a particular content provider 100, using a particular search engine 410, and a particular content base 115. For other content providers 100, having other characteristics, different query classes and corresponding search strategies may be used.

Examples of Determining Query Classes and Assigning User Queries To Classes

The above example described using four query classes. However, the number of query classes and/or their particular query classification criteria may vary depending on, among other things, the particular content provider 100 and its content body 115, the user base of content provider 100, and/or the particular search engine 410 used by content provider 100. In one example, such determinations are based on data from customer query logs maintained by the content provider 100 of previous user sessions. For example, novice users typically tend to be more verbose in their queries than more advanced users. In one example, query logs indicated that roughly 50% of the users typically pose two or three word queries, about 15% pose single word queries, about 15% pose four word queries, and the remaining about 20% pose other multi-word queries. Also, many users typically separate the information-bearing words with some common words that typically don't add value to the search. Examples of such queries including both information-bearing and common words are: (1) "trouble installing the service pack," and (2) "I get a blue screen after installing hard disk." In this example, the information-bearing words are in the phrases: (1) "trouble installing" and "service pack," and (2) "blue screen" and "installing hard disk," respectively.

Figure 12:
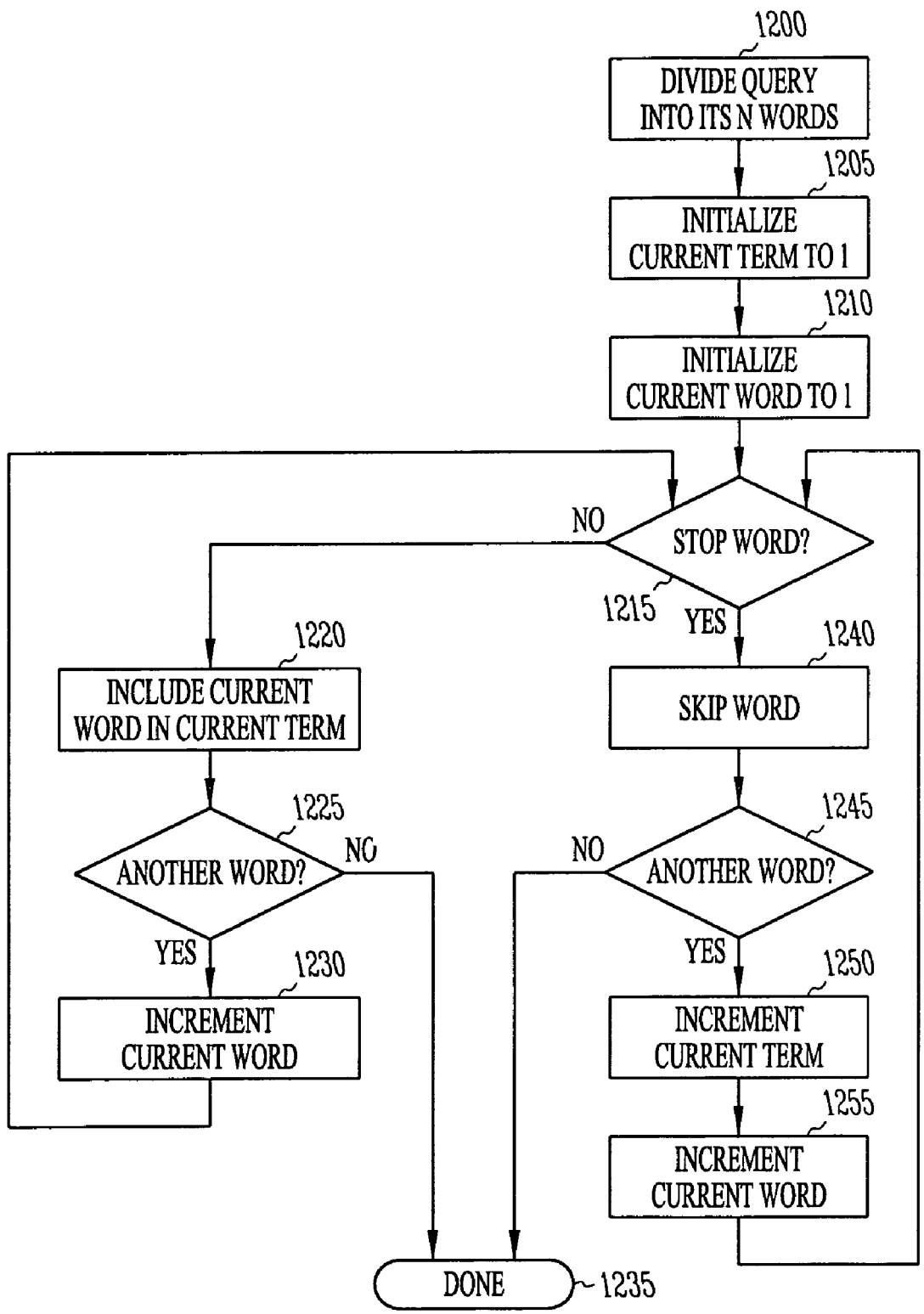
FIG. 12 is a flow chart illustrating generally one example of a term-extraction algorithm for parsing the user-query into information-bearing terms.

FIG. 12 is a flow chart illustrating generally one example of a term-extraction algorithm for parsing the user-query into information-bearing terms, at least in part by designating a list of about 500 stopwords deemed too common to add value to the search. At 1200, the user query is divided into its N words. At 1205, a "current term" index is initialized to 1. At 1210, a "current word" index is initialized to 1. At 1215, the current word is compared to the stopword list to determine whether the current word is a stopword. If not, then at 1220, the current word is included within the current term, and, if at 1225 another word exists beyond the current word, in the N words of the user query, the current word index is incremented by 1 at 1230, and process flow returns to 1215 to determine if the new current word is a stopword.

If at 1225, no more words are left in the N words of the user query, the process of extracting information-bearing terms (i.e., words and/or phrases) from the user query is complete, at 1235.

At 1215, if the current word is a stopword, then at 1240, the stopword is skipped (i.e., not included within the current term). If, at 1245, another word is left in the N words of the user query, then at 1250 the current term index is incremented. Then, at 1255, the current word index is incremented before the illustrated process flow returns to 1215. If, at 1245, no words are left in the N words of the user query, then at 1235, the process of extracting information-bearing terms from the user query is complete.

In a further example, exception processing is included. For example, a three word user query that consists of two information-bearing words separated by a stopword (e.g., "installing the disk") is, in one embodiment, combined into a single term of two information-bearing words, rather than treating such a query as two terms of one information-bearing word each. The inclusion of this or other exceptions to the flow chart of FIG. 12 is, in one example, based upon evaluation of the query logs of previous user sessions maintained by the particular content provider 100.

Although, in one example, the extracted information-bearing terms are used to assign the user query to one of the four query classes listed above, in other examples, additional or alternative query classes are used, with a corresponding search strategy that is particularized to that query class. An illustrative example includes a fifth query class ("Excessively Verbose") where the number of words in the user query (including any stopwords) exceeds 5 words, and the number of extracted terms exceeds three terms. Other query classes may also be used.

CONCLUSION

In the above discussion and in the attached appendices, the term "computer" is defined to include any digital or analog data processing unit. Examples include any personal computer, workstation, set top box, mainframe, server, supercomputer, laptop or personal digital assistant capable of embodying the inventions described herein. Examples of articles comprising computer readable media are floppy disks, hard drives, CD-ROM or DVD media or any other read-write or read-only memory device.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein. Moreover, the terms "first," "second," and "third," etc. are used merely as labels, and are not intended to impose numerical requirements on their objects. The term "criteria" is intended to include both a single criterion as well as the plural.

What is claimed is:

1. A computer-implemented method including:
   (a) obtaining from a user a user query including at least some language;
   (b) classifying the user query into a query class;
   (c) selecting a search strategy using the query class in which the user query is classified, the selecting the search strategy including obtaining a set of search criteria;
   (d) performing a first search for documents relevant to the user query using at least one search criteria selected from the set of search criteria, the set of search criteria including at least two different search criteria defining different search specificities when using identical terms from the user query language; and
   (e) evaluating a first search result returned by the first search to determine whether to perform a subsequent search using at least one different search criteria from the set of search criteria.

2. The method of claim 1, further including, if a subsequent search is indicated by (e), modifying the search criteria and repeating (d) and (e).

3. The method of claim 1, further including, if a subsequent search is indicated by (e), modifying the search criteria and repeating (d) and (e) unless a list of different searches has been exhausted.

4. The method of claim 1, further including: (f) returning a list of documents to the user.

5. The method of claim 1, further including: (f) ranking documents; and (g) returning a list of ranked documents to the user.

6. The method of claim 5, in which the ranking of a particular document is based at least in part on which performed search returned that particular document.

7. The method of claim 5, in which the ranking of a particular document is based at least in part on a degree to which a particular document satisfied the search criteria associated with the particular performed search that returned that particular document.

8. The method of claim 5, in which the ranking of a particular document is based at least in part on a weight with which the particular document is associated with a particular concept node in one of multiple taxonomies.

9. The method of claim 1, further including determining a characteristic of the subsequent search based at least in part on the first search result.

10. The method of claim 9, in which determining a characteristic of the subsequent search includes formulating more specific criteria than criteria of the first search.

11. The method of claim 9, in which determining the characteristic of the subsequent search includes determining, based at least in part on the first search result, at least one of:
    a criteria of the subsequent search within a dimension;
    a dimension of the subsequent search criteria;
    a search ordering of the subsequent search with respect to other subsequent searches having different criteria or dimensions; and
    a scheme in which the search ordering is traversed.

12. The method of claim 11, in which the determining the scheme in which the search ordering is traversed includes using an approximately binary divide-and-conquer traversal of the search ordering.

13. The method of claim 1, in which selecting the search strategy includes selecting at least one of:
    a criteria of the subsequent search within a dimension;
    a dimension of the subsequent search criteria;
    a search ordering of the subsequent search with respect to other subsequent searches having different criteria or dimensions; and
    a scheme in which the search ordering is traversed.

14. The method of claim 1, in which classifying the user query includes:
    parsing the user query into information-bearing terms, based at least in part on any noninformation-bearing stopwords included in the user query; and classifying the user query into a query class based on at least one of:

how many information-bearing terms are obtained from the user query; and how many words are included in the information-bearing terms obtained from the user query.

15. The method of claim 1, in which classifying the user query into a query class includes classifying the user query into query classes that include:
- a first query class in which the user query includes a single information-bearing term;
- a second query class in which the user query includes between two and three information-bearing terms, inclusive;
- a third query class in which the user query includes more than three information-bearing terms without any accompanying noninformation-bearing stopwords; and
- a fourth query class in which the user query includes more than three information-bearing terms and at least one noninformation-bearing stopword.

16. The method of claim 15, further including a first ordered list of searches associated with the first query class, in which the first ordered list is ordered as:
(1) a first search for the term in particular regions of the document;
(2) a second search for at least one of the term and word form variations of the term in the particular regions of the document;
(3) a third search for the term anywhere in the document;
(4) a fourth search for at least one of the term and word form variations of the term anywhere in the document; and
(5) a fifth search for at least one of the term, word form variations of the term, and synonyms of the term anywhere in the document.

17. The method of claim 16, in which at least one of the searches allows casing variations.

18. The method of claim 15, further including a second ordered list of searches associated with the second query class, in which the second ordered list is ordered as:
(1) a first search for all of the terms appearing together as a phrase in particular regions of the document;
(2) a second search for all of the terms appearing together as a phrase anywhere in the document;
(3) a third search for all of the terms appearing near each other anywhere in the document;
(4) a fourth search for all of the terms appearing anywhere in the document;
(5) a fifth search for all of the terms, allowing word form variations of the terms, anywhere in the document;
(6) a sixth search for in-sequence pairs of terms anywhere in the document; and
(7) a seventh search for any of the terms anywhere in the document.

19. The method of claim 18, in which at least one of the searches allows casing variations.

20. The method of claim 15, further including a third ordered list of searches associated with the third query class, in which the third ordered list is ordered as:
(1) a first search for all of the terms appearing near each other anywhere in the document;
(2) a second search for all of the terms appearing anywhere in the document;
(3) a third search for all of the terms, allowing word form variations, anywhere in the document;
(4) a fourth search for all subsets of the terms appearing anywhere in the document, in which the subset includes all but one of the terms; and
(5) a fifth search for all subsets of the terms appearing anywhere in the document, in which the subset size is sequentially decreased from all but one of the terms to subsets of individual terms.

21. The method of claim 20, in which at least one of the searches allows casing variations.

22. The method of claim 15, further including a fourth ordered list of searches associated with the fourth query class, in which the fourth ordered list is ordered as:
(1) a first search for all terms appearing together as a phrase anywhere in the document;
(2) a second search for all terms appearing anywhere in the document;
(3) a third search iterating through subsets of terms, in which the subset size is sequentially decreased from all but one of the terms to subsets of individual terms;
(4) a fourth search iterating through subsets of terms, allowing word form variations, in which the subset size is sequentially decreased from all but one of the terms to subsets of individual terms;
(5) a fifth search for any complete term anywhere in the document; and
(6) a sixth search for any term anywhere in the document, allowing subphrases within each term.

23. The method of claim 22, in which at least one of the searches allows casing variations.

24. A computer-readable medium including instructions that, when executed on a computer, perform the method of claim 1.

25. The method of claim 1, in which the set of search criteria is automatically generated.

26. A computer-implemented method including:
obtaining from a user a user query including at least some language;
using an ordered list, S1, S2, . . . , SN, of at least two searches, each search using at least one search criteria that is different from the other searches, the search criteria selected from a multidimensional set of automatically generated search criteria, the set of search criteria including at least two different dimensions representing different approaches of varying search specificity; and
performing a search for documents relevant to the user query using one of the S1, S2, . . . , SN searches, starting with the S1 search, evaluating search results corresponding to the search performed to determine whether to perform a subsequent search and, if the search results yielded an insufficient number of documents relevant to the user query, moving to and performing another search in the list; and
returning a list of the documents returned by the at least one search that was performed.

27. The method of claim 26, in which the using the ordered list includes using a list ordered at least substantially according to specificity of the search criteria, in which S1 provides at least approximately more specific search criteria than S2, . . . , SN, and in which SN provides at least approximately more general search criteria than S1, S2, . . . , S(N−1).

28. The method of claim 27, in which S1 provides more specific search criteria than S2, . . . , SN, and in which SN provides more general search criteria than S1, S2, . . . , S(N−1).

29. The method of claim 28, in which the using the ordered list includes using a list ordered throughout according to specificity of the search criteria.

30. The method of claim 29, in which the list is ordered dynamically based at least in part on a result obtained from a previously-executed search on the user query.

31. The method of claim 27, in which the search criteria uses the language from the user query.

32. The method of claim 27, in which the at least approximately more specific search criteria uses an at least approximately more exact matching of a particular term from the user query to language in the documents, and the more general search criteria uses an at least approximately less exact matching of the particular term from the user query to language in the documents.

33. The method of claim 27, in which specificity of the search criteria varies along at least two of a textual dimension, a linguistic dimension, and a thesaurus dimension.

34. The method of claim 27, in which the search criteria specifies at least one predefined portion of the documents to be used in carrying out the search.

35. The method of claim 34, in which the predefined portion of the documents uses at least one of a title portion, a summary portion, and an abstract portion.

36. The method of claim 27, in which the at least approximately more specific search criteria uses a more specific portion of the documents, and the at least approximately more general search criteria uses a less specific portion of the documents.

37. The method of claim 26, further including, before the returning the list, ranking the documents.

38. The method of claim 37, in which the ranking of a particular document is based at least in part on which of the at least one performed searches returned that particular document.

39. The method of claim 37, in which the ranking of a particular document is based at least in part on a degree to which a particular document satisfied the search criteria associated with the at least one performed searches that returned that particular document.

40. The method of claim 37, in which the ranking of a particular document is based at least in part on a weight with which the particular document is associated with a particular concept node.

41. The method of claim 26, further including forming the ordered list based at least in part on the user query.

42. The method of claim 41, further including classifying the user query, and in which forming the ordered list based at least in part on the user query includes forming the ordered list based at least in part on the classification of the user query.

43. The method of claim 26, further including adjusting the ordered list based at least in part on search results from a previous search on the obtained user query.

44. The method of claim 26, in which the insufficient number of documents is determined by at least one of:
too few documents;
too many documents; and
the number of documents being outside a predetermined range.

45. A computer-readable medium including instructions that, when executed on a computer, perform the method of claim 26.

46. A computer-implemented method of searching for documents that are relevant to a user's query, the method including:
obtaining from a user a user query including at least some language;
using an ordered list, S1, S2, ..., SN, of at least two searches, each search using at least one search criteria that is different from the other searches, in which the list is ordered substantially according to specificity of the search criteria, in which S1 provides at least approximately more specific search criteria than S2, ..., SN, and in which SN provides at least approximately more general search criteria than S1, S2, ..., S(N−1), and wherein the search criteria is selected from an automatically generated set of search criteria that includes at least two different search criteria that specify different regions of the document to be used in carrying out the search;
performing a search for documents relevant to the user query using one of the S1, S2, ..., SN searches, starting with the S1 search, evaluating search results corresponding to the search performed to determine whether to perform a subsequent search and, if the search results yielded an insufficient number of documents relevant to the user query, moving to and performing another search in the list;
ranking the documents; and
returning a ranked list of the documents returned by the at least one search that was performed.

47. The method of claim 46, in which the ranking of a particular document is based at least in part on which of the at least one performed searches returned that particular document.

48. The method of claim 46, in which the ranking of a particular document is based at least in part on a degree to which a particular document satisfied the search criteria associated with the at least one performed searches that returned that particular document.

49. The method of claim 46, in which the ranking of a particular document is based at least in part on a weight with which the particular document is associated with a particular concept node.

50. The method of claim 46, in which the at least approximately more specific search criteria uses an at least approximately more exact matching of a particular term from the user query to language in the documents, and the at least approximately more general search criteria uses an at least approximately less exact matching of a particular term from the user query to language in the documents.

51. The method of claim 46, in which the insufficient number of documents is determined by at least one of:
too few documents;
too many documents; and
the number of documents being outside a predetermined range.

52. A computer-readable medium including instructions that, when executed on a computer, perform the method of claim 46.

53. An automated content provider system including:
a user query input to receive a user query;
a search query generator, coupled to the user query input, the search query generator to generate a search using the user query to formulate corresponding search criteria selected from an automatically generated set of search criteria, the set of search criteria including at least two different search criteria defining different search specificities when using identical terms from the user query language;
a search engine, including an input coupled to the search query generator and an output, the search engine using the search criteria to perform the search and to provide a corresponding search result at the search engine output;

a search result evaluator, coupled to the search engine output and an input of the search query generator, the search result evaluator to evaluate the search result, in which the search query generator and search engine operate to generate or perform at least one subsequent search using different search criteria from the set of search criteria, if indicated by the evaluation of the search result by the search result evaluator; and a result ranking engine, coupled to the search engine output to rank documents returned in at least one search result, in which the result ranking engine includes an output user interface, in which the result ranking engine ranks a particular document based at least in part on which search returned that particular document.

54. The system of claim 53, in which the result ranking engine ranks a particular document based at least in part on a degree to which that particular document satisfied the search criteria used in at least one search that returned that particular document.

55. The system of claim 53, further including a knowledge corpus including documents associated with concept nodes arranged in multiple taxonomies, and in which the result ranking engine ranks a particular document based at least in part on a weight with which the particular document is associated with a particular concept node.

56. The system of claim 53, in which the content provider includes an ordered list of searches executed by the search engine if indicated by the search result evaluator.

57. The system of claim 56, in which the search query generator forms the ordered list based at least in part on the user query.

58. The system of claim 57, in which the search query generator classifies the user query and forms the ordered list based at least in part on the classification of the user query.

59. The system of claim 56, in which the search query generator modifies the ordered list based at least in part on a search result provided by the search engine.

60. An automated content provider system including:

a user query input to receive a user query;

a search query generator, coupled to the user query input, the search query generator to generate an ordered list, S1, S2, . . . , SN, of at least two searches using the user query to formulate corresponding search criteria, each search including at least one search criteria that is different from the other searches, the search criteria selected from an automatically generated set of search criteria, the set of search criteria including at least two different search criteria defining different search specificities when using identical terms from the user query language;

a search engine, including a input coupled to the search query generator and an output, the search engine using the search criteria to perform ones of the S1, S2, . . . , SN searches, starting with the S1 search;

and to provide a corresponding search result at the search engine output;

a search result evaluator, coupled to the search engine output and an input of the search query generator, the search result evaluator to evaluate the search result to determine whether to perform a subsequent search from the ordered list based on whether existing search results yielded an insufficient number of documents relevant to the user query; and a result ranking engine, coupled to the search engine output to rank documents returned in at least one search result, in which the result ranking engine includes an output user interface, in which the result ranking engine ranks a particular document based at least in part on which search returned that particular document.

61. The system of claim 60, in which the ordered list is ordered at least substantially according to specificity of the search criteria, in which S1 provides at least approximately more specific search criteria than S2, . . . , SN, and in which SN provides at least approximately more general search criteria than S1, S2, . . . , S(N−1).

62. The system of claim 61, in which S1 provides more specific search criteria than S2, . . . , SN, and in which SN provides more general search criteria than S1, S2, . . . , S(N−1).

63. The system of claim 62, in which the ordered list includes a list ordered throughout according to specificity of the search criteria.

64. The system of claim 63, in which the ordered list is ordered dynamically based at least in part on a result obtained from a previously-executed search on the user query.

65. The system of claim 61, in which specificity of the search criteria varies along at least one of a textual dimension, a linguistic dimension, and a thesaurus dimension.

66. The system of claim 61, in which the at least approximately more specific search criteria uses at least approximately more exact matching between a particular term in user query language and document language, and the at least approximately more general search criteria uses at least approximately less exact matching between a particular term in user query language and document language.

67. The system of claim 66, in which the search criteria specifies at least one predefined portion of the documents to be used in carrying out the search.

68. The system of claim 66, in which the at least approximately more specific search criteria uses a more specific portion of the documents, and the at least approximately more general search criteria uses a less specific portion of the documents.

69. The system of claim 68, in which the predefined portion of the documents uses at least one of a title portion, a summary portion, and an abstract portion.

70. The system of claim 60, in which the result ranking engine ranks a particular document based at least in part on a degree to which that particular document satisfied the search criteria used in at least one search that returned that particular document.

71. The system of claim 60, further including a knowledge corpus including documents associated with concept nodes arranged in multiple taxonomies, and in which the result ranking engine ranks a particular document based at least in part on a weight with which the particular document is associated with a particular concept node.

72. The system of claim 60, in which the content provider includes an ordered list of searches executed by the search engine if indicated by the search result evaluator.

73. The system of claim 72, in which the search query generator forms the ordered list based at least in part on the user query.

74. The system of claim 73, in which the search query generator classifies the user query and forms the ordered list based at least in part on the classification of the user query.

75. The system of claim 60, in which the search query generator modifies the ordered list based at least in part on a search result provided by the search engine.

76. The system of claim 60, in which the insufficient number of documents is determined by at least one of:
- too few documents;
- too many documents; and
- the number of documents being outside a predetermined range.

77. A computer-implemented method of searching for documents that are relevant to a user's query, the method including:
- obtaining from a user a user query including at least some language;
- using an automatically generated ordered list of S1, S2, . . . , SN searches, the searches using search criteria taken from a plurality of dimensions, each dimension including a plurality of search criteria ranging from approximately more specific to approximately more general, the plurality of dimensions including at least two different dimensions representing different approaches of varying search specificity; and
- performing a search for documents relevant to the user query using one of the S1, S2, . . . , SN searches, starting with the S1 search, evaluating search results corresponding to the search performed to determine whether to perform a subsequent search and, if the evaluation deems the search results insufficient, then moving to and performing another search in the list.

78. The method of claim 77, in which the ordered list is ordered according to a varying specificity along each particular dimension while holding specificity of other dimensions constant.

79. The method of claim 77, in which each search in the ordered list includes a criteria from each dimension.

80. The method of claim 77, in which moving to and performing another search in the ordered list includes moving to and performing the next search in the list.

81. The method of claim 77, in which moving to and performing another search in the ordered list includes moving through the list in an at least approximately binary strategy that divides a portion of the ordered list to be searched into two segments and selects a particular segment of the ordered list based on an evaluation of the search results.

82. The method of claim 77, in which the ordered list is one of a plurality of ordered search lists that are mapped to query classes, and further including evaluating the user query for classification into a particular one of the query classes and using an ordered search list corresponding to the particular one of the query classes.

83. The method of claim 77, further including automatically reclassifying the user query to a different one of the query classes if results of a performed search provide an indication for such a reclassification.

84. The method of claim 77, in which the ordered list is one of a plurality of ordered lists, and further including automatically switching to a different one of the ordered lists if results of a performed search provide an indication for such a switching.

* * * * *

UNITED STATES PATENT AND TRADEMARK OFFICE
CERTIFICATE OF CORRECTION

PATENT NO. : 7,206,778 B2  Page 1 of 1
APPLICATION NO. : 10/023433
DATED : April 17, 2007
INVENTOR(S) : Bode et al.

It is certified that error appears in the above-identified patent and that said Letters Patent is hereby corrected as shown below:

In column 4, lines 49-50, delete "IIMPLEMENTiNG" and insert
-- IMPLEMENTING --, therefor.

In column 6, line 11, delete "CLASSIFYiNG" and insert -- CLASSIFYING --, therefor.

In column 34, line 20 (Approx.), in Claim 83, delete "Claim 77" and insert
-- Claim 82 --, therefor.

Signed and Sealed this

Twentieth Day of November, 2007

JON W. DUDAS
*Director of the United States Patent and Trademark Office*